(12) United States Patent
Chu

(10) Patent No.: US 6,216,185 B1
(45) Date of Patent: Apr. 10, 2001

(54) PERSONAL COMPUTER PERIPHERAL CONSOLE WITH ATTACHED COMPUTER MODULE

(75) Inventor: William W. Y. Chu, Los Altos, CA (US)

(73) Assignee: Acqis Technology, Inc., Mountain View, CA (US)

(*) Notice: Subject to any disclaimer, the term of this patent is extended or adjusted under 35 U.S.C. 154(b) by 0 days.

(21) Appl. No.: 09/149,548

(22) Filed: Sep. 8, 1998

Related U.S. Application Data

(60) Provisional application No. 60/083,886, filed on May 1, 1998, and provisional application No. 60/092,706, filed on Jul. 14, 1998.

(51) Int. Cl.[7] ....................................................... G06F 13/00
(52) U.S. Cl. .......................... 710/101; 710/72; 710/129; 710/102; 713/300
(58) Field of Search ............................. 710/101, 72, 129, 710/62, 71, 106, 100, 102, 200, 103; 439/928.1; 375/219; 361/679–687, 724–727, 752, 753, 796; 345/169; 379/93.01; 713/300; 307/66

(56) References Cited

U.S. PATENT DOCUMENTS

| | | |
|---|---|---|
| 4,769,764 | * 9/1988 | Levanon . |
| 5,278,509 | 1/1994 | Haynes et al. . |
| 5,278,730 | 1/1994 | Kikinis . |
| 5,293,487 | 3/1994 | Free . |
| 5,319,771 | * 6/1994 | Takeda . |

(List continued on next page.)

FOREIGN PATENT DOCUMENTS

| | | |
|---|---|---|
| 0 722 138 | 7/1996 | (EP) . |
| 6-289953 | 10/1994 | (JP) . |
| 92 18924 | 10/1992 | (WO) . |
| 94 00970 | 1/1994 | (WO) . |
| 95 13640 | 5/1995 | (WO) . |

OTHER PUBLICATIONS

Digital Semiconductor, 21152 PCI–to–PCI Bridge Product Brief (02/96).
Intel Corporation, Intel 430TX PCISET: 82439TX System Controller (MTXC) Architectural Overview (02/97).
Intel Corporation, Intel 82371AB PCI–to–ISA/IDE Xcelerator (PIIX4) Architectural Overview (04/97).
Intel Corporation, Intel 440LX AGPSET: 82443LX PCI A.G.P. Controller (PAC) Advance Information (08/97).
National Semiconductor, DA90CR215/DS90CR216 General Description (07/97).
National Semiconductor, DS90CR215 Product Folder.
Video Electronics Standards Association (VESA), Plug and Display (P&D) Standard, P&D and Digital Transition Minimized Differential Signaling (TMDS) Video Transmission Overview, Version 1, Revision 0, pp. 1 & 31–34 (1997).

*Primary Examiner*—Gopal C. Ray
(74) *Attorney, Agent, or Firm*—Townsend and Townsend and Crew LLP

(57) ABSTRACT

A personal computer system comprises physically separate units and an interconnection between the units. An attached computing module (ACM) contains the core computing power and environment for a computer user. A peripheral console (PCON), contains the power supply and primary input and output devices for the computer system. To form an operational computer system, an ACM is coupled with a PCON. The plug-in module design of the ACM, and the concentration of high-value components therein (both in terms of high-value hardware and high-value files), makes it easy for a user to transport the high-value core between multiple PCON's, each of which can enjoy a relatively low cost. The concentration of a user's core computing environment in a small, portable package also makes it possible for large organizations to perform moves, adds, and changes to personal computer systems with greater efficiency.

42 Claims, 10 Drawing Sheets

U.S. PATENT DOCUMENTS

| | | |
|---|---|---|
| 5,331,509 | 7/1994 | Kikinis . |
| 5,355,391 | 10/1994 | Horowitz et al. . |
| 5,463,742 | 10/1995 | Kobayashi . |
| 5,539,616 | 7/1996 | Kikinis . |
| 5,550,710 | 8/1996 | Rahamim et al. . |
| 5,550,861 * | 8/1996 | Chan et al. . |
| 5,578,940 | 11/1996 | Dillon et al. . |
| 5,600,800 | 2/1997 | Kikinis et al. . |
| 5,606,717 | 2/1997 | Farmwald et al. . |
| 5,640,302 | 6/1997 | Kikinis . |
| 5,659,773 | 8/1997 | Huynh et al. . |
| 5,663,661 | 9/1997 | Dillon et al. . |
| 5,680,126 | 10/1997 | Kikinis . |
| 5,774,704 * | 6/1998 | Williams . |
| 5,941,965 * | 8/1999 | Moroz et al. . |
| 5,948,047 | 9/1999 | Jenkins et al. ............... 708/141 |
| 5,999,952 | 12/1999 | Jenkins et al. ............... 708/100 |
| 6,029,183 | 2/2000 | Jenkins et al. ............... 708/100 |

* cited by examiner

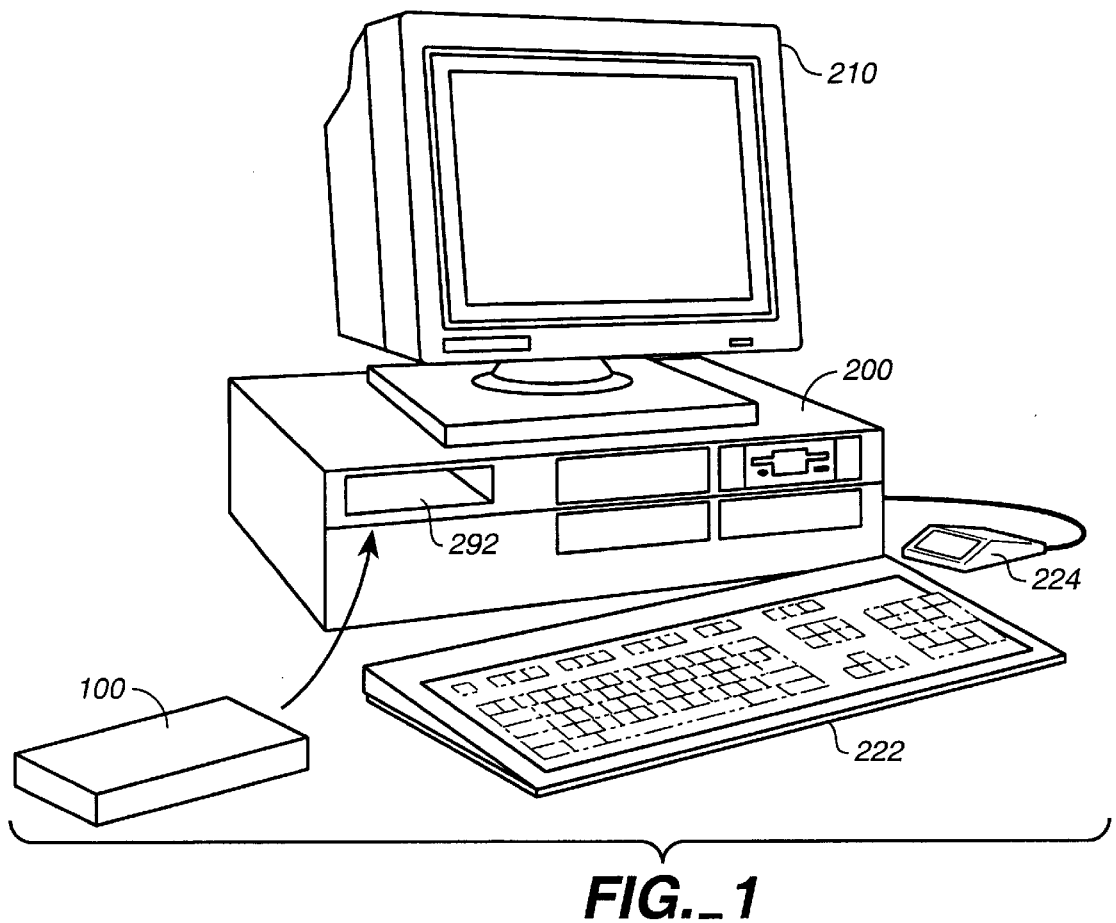
FIG._1
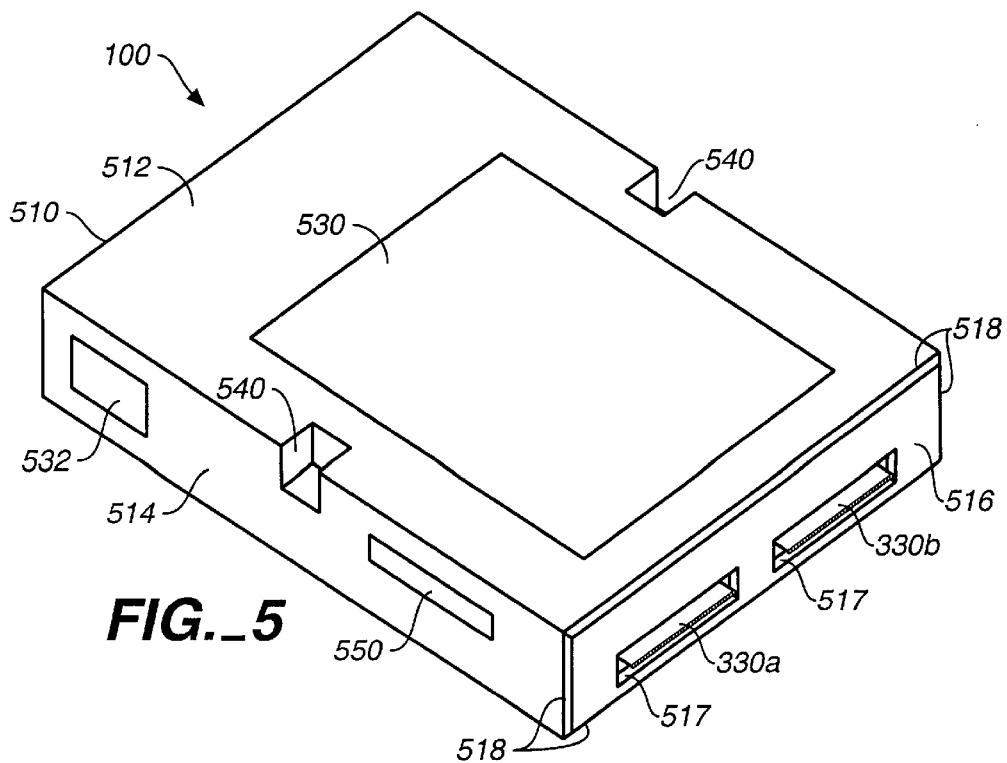
FIG._5

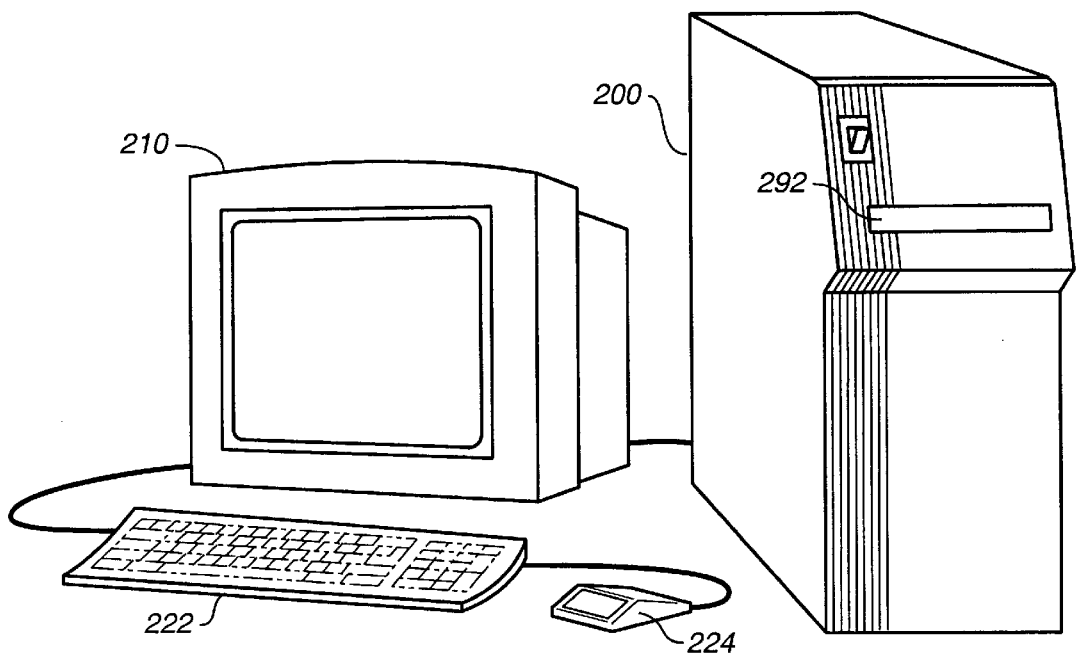
FIG._2A
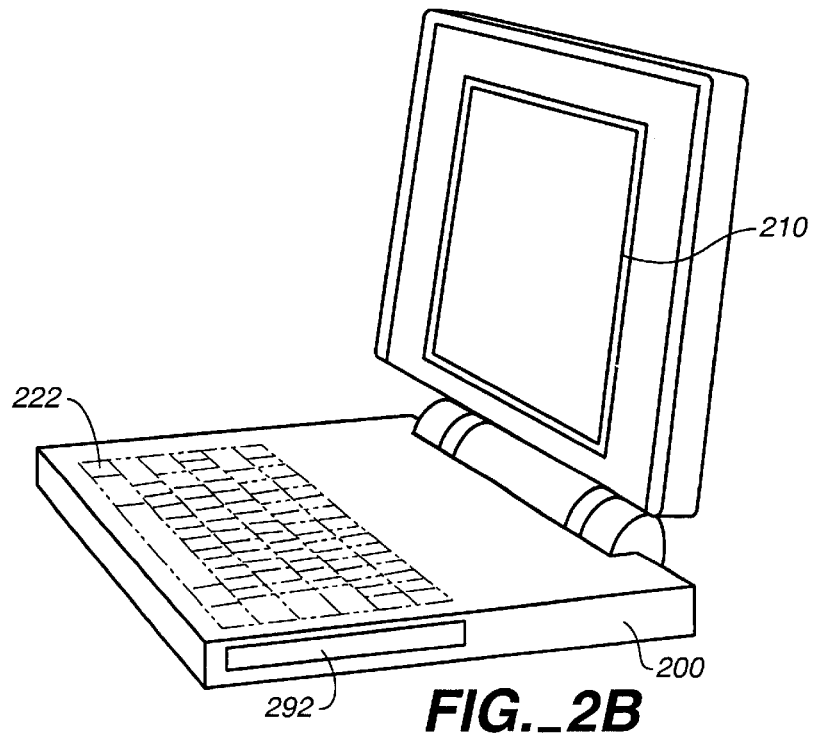
FIG._2B

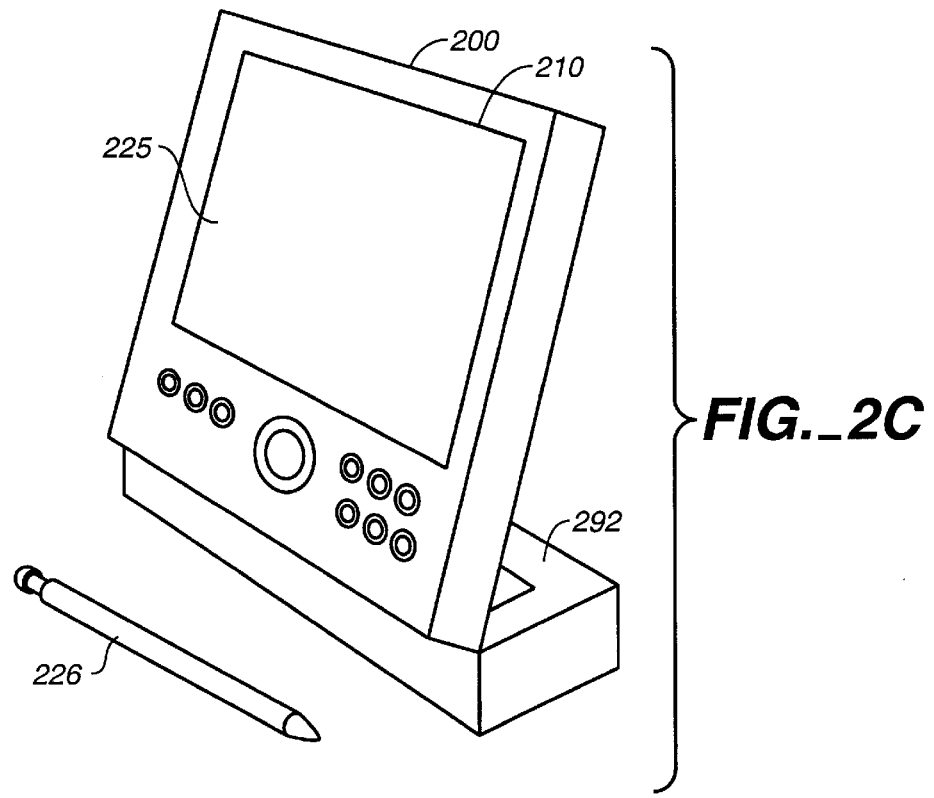
FIG._2C
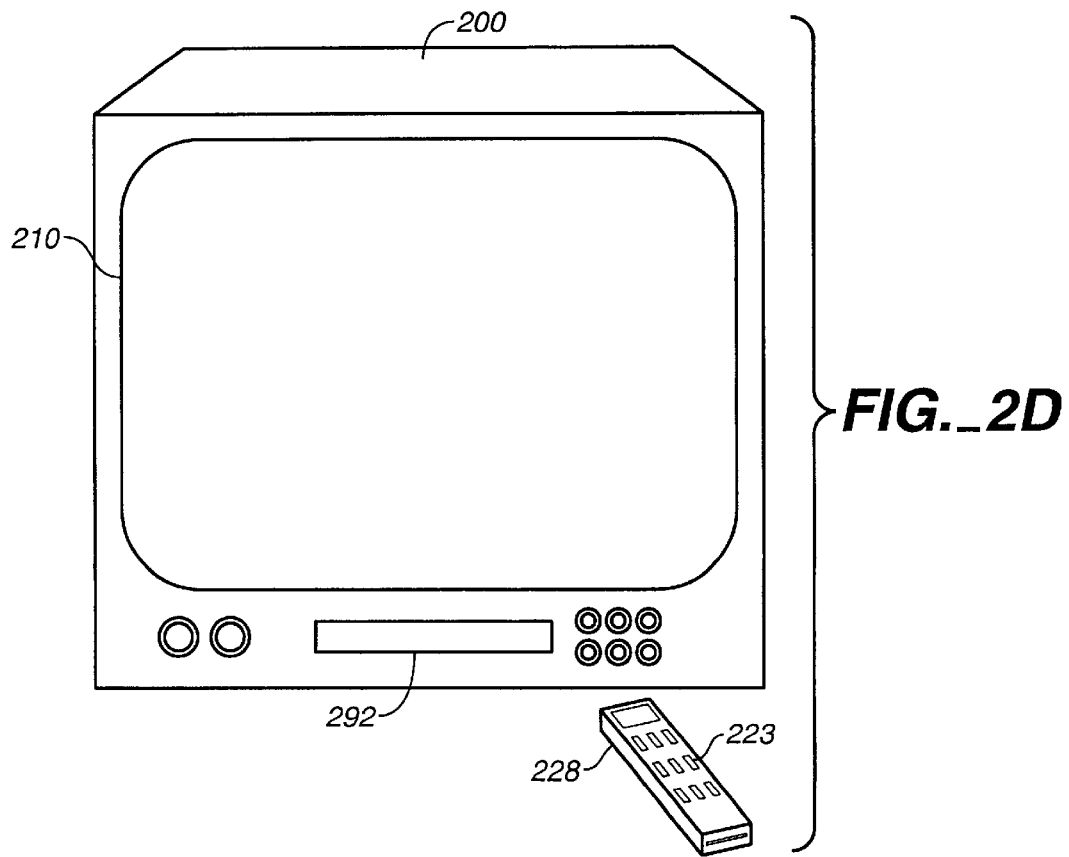
FIG._2D

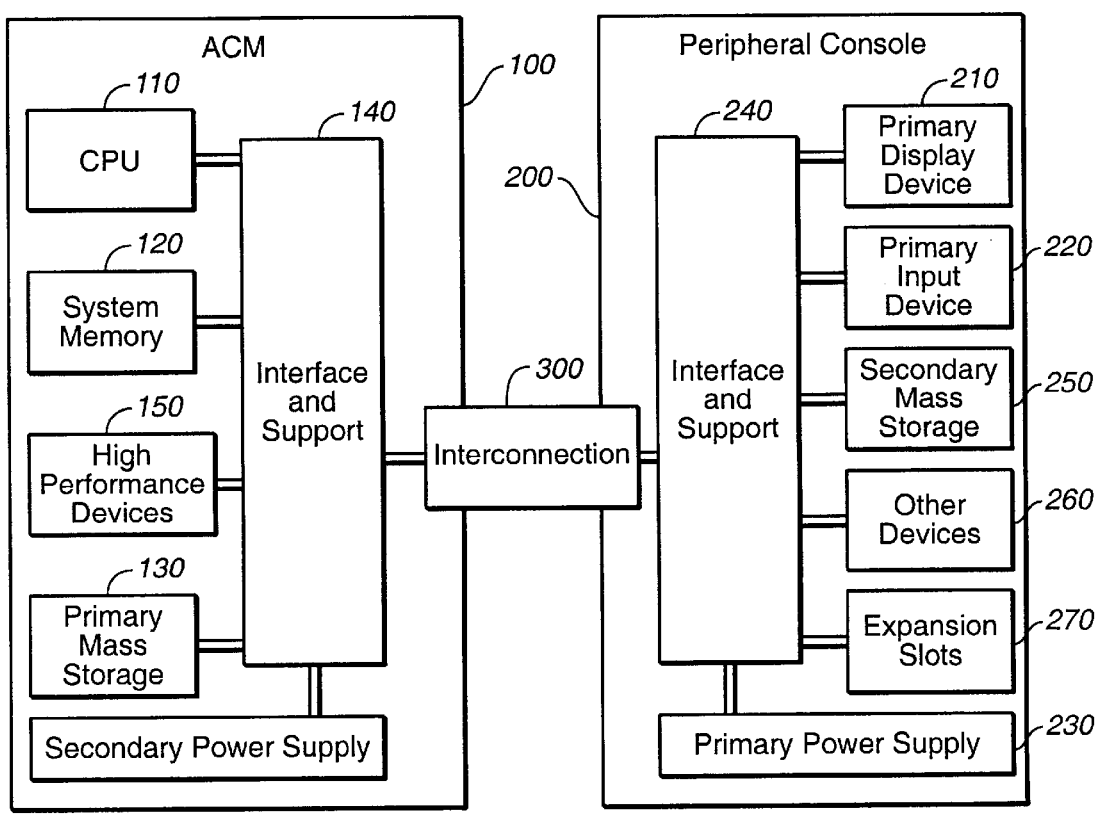
FIG._3

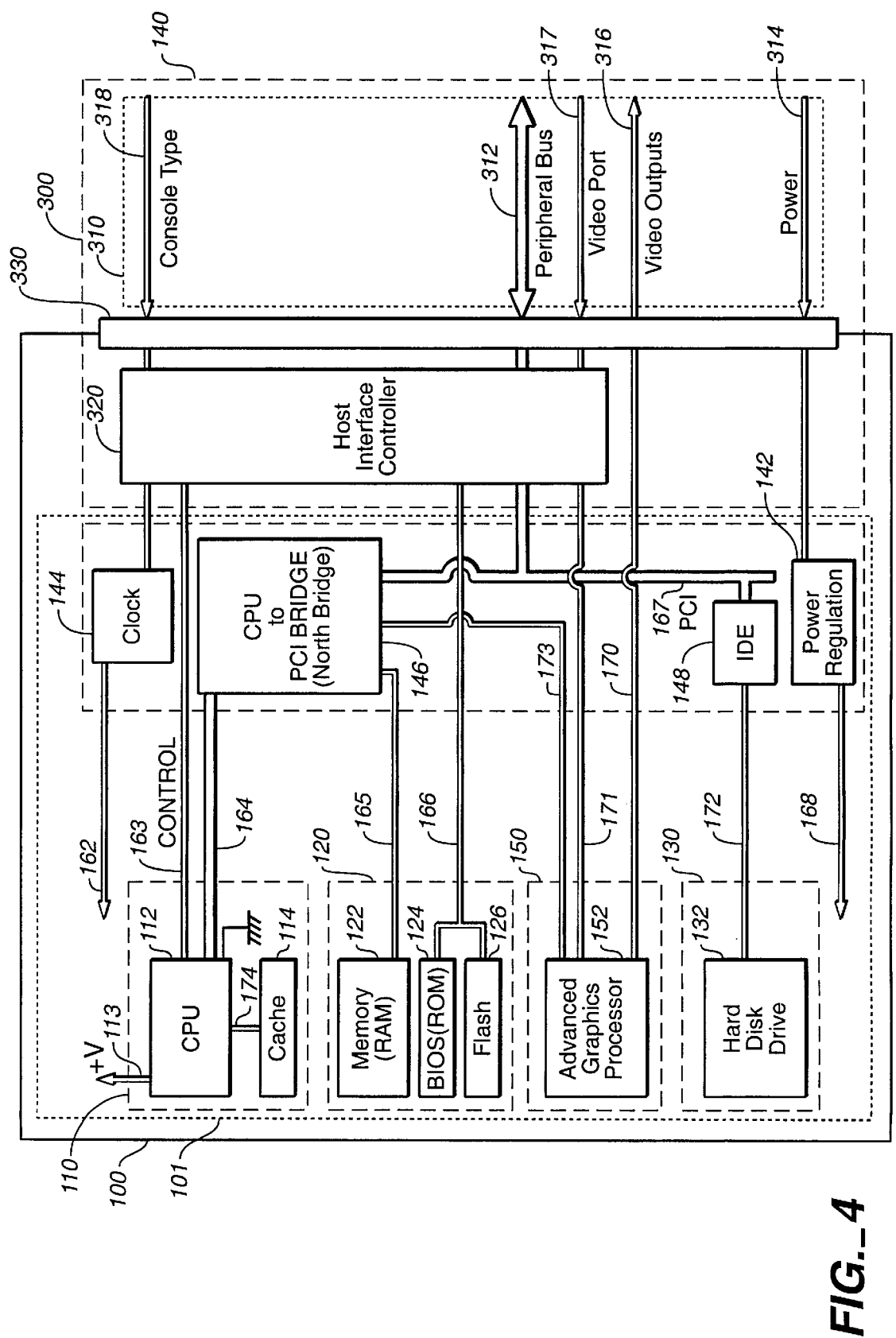
FIG._4

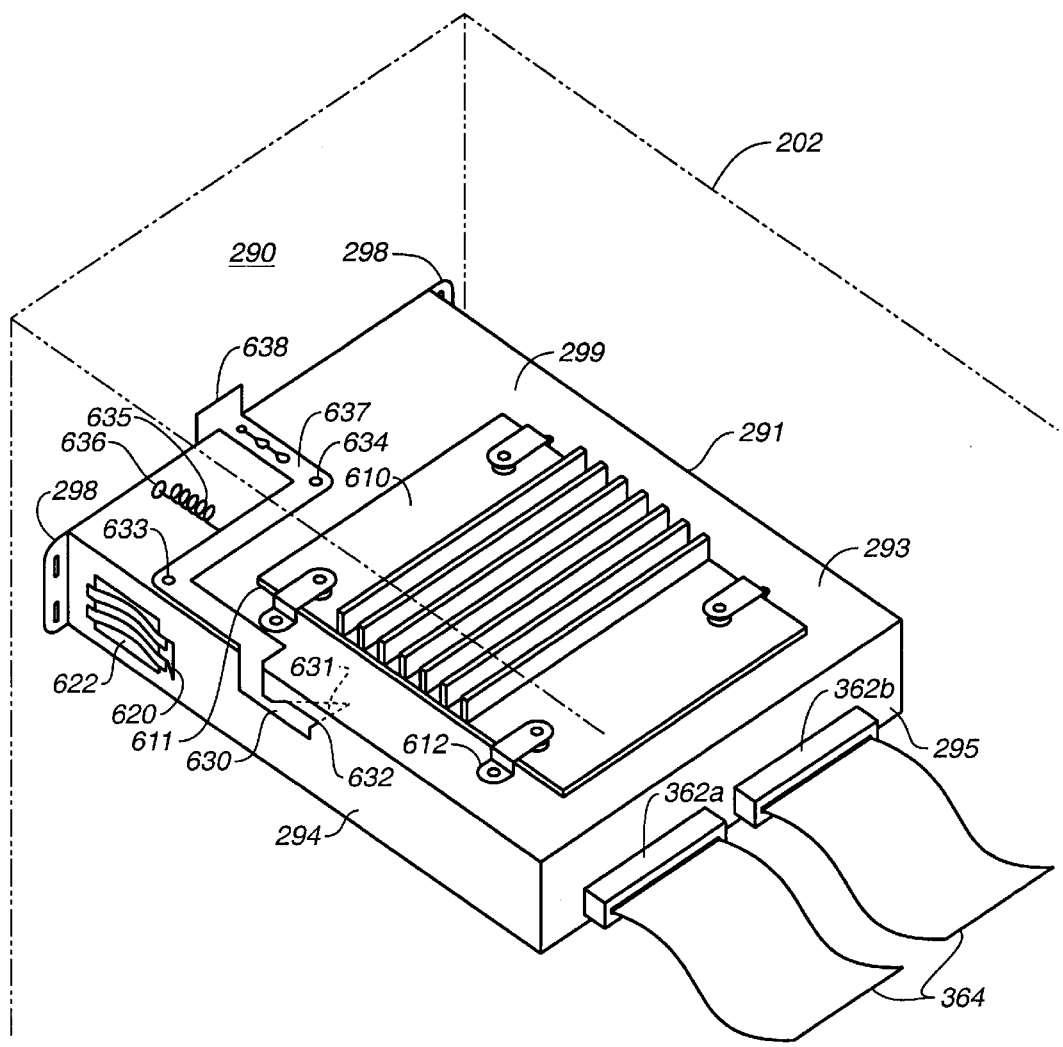
FIG._5B

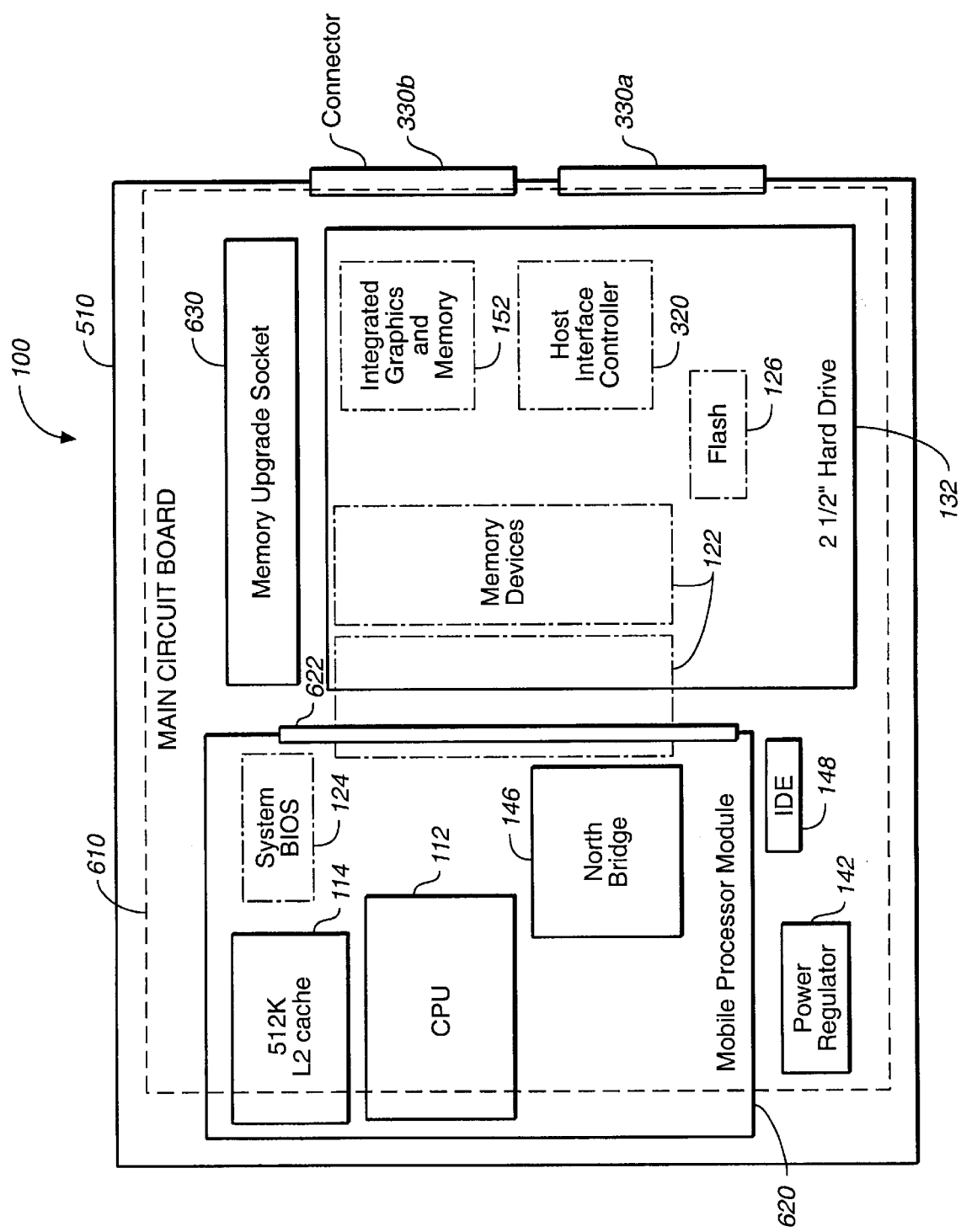
FIG._6

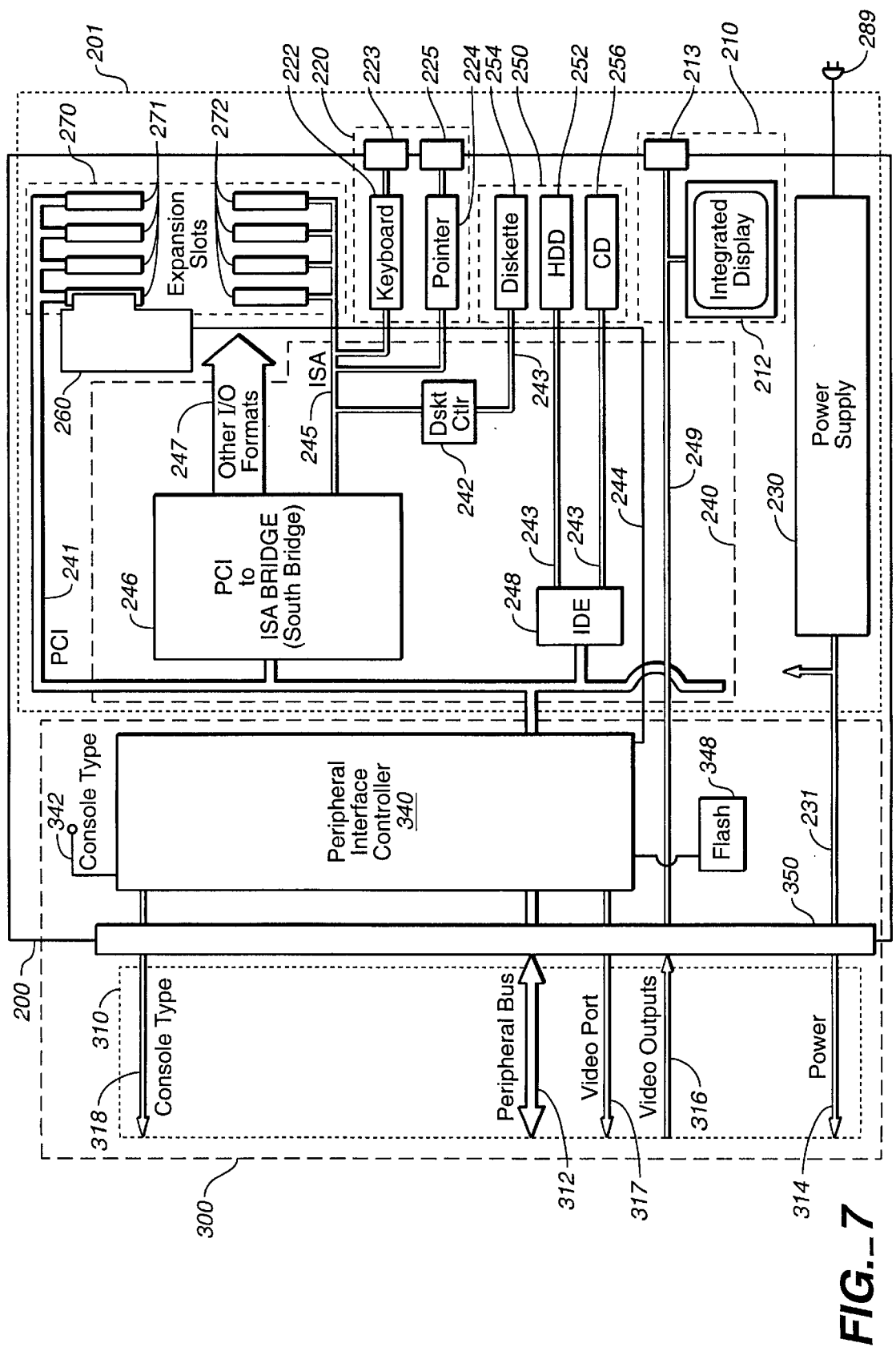
FIG._7

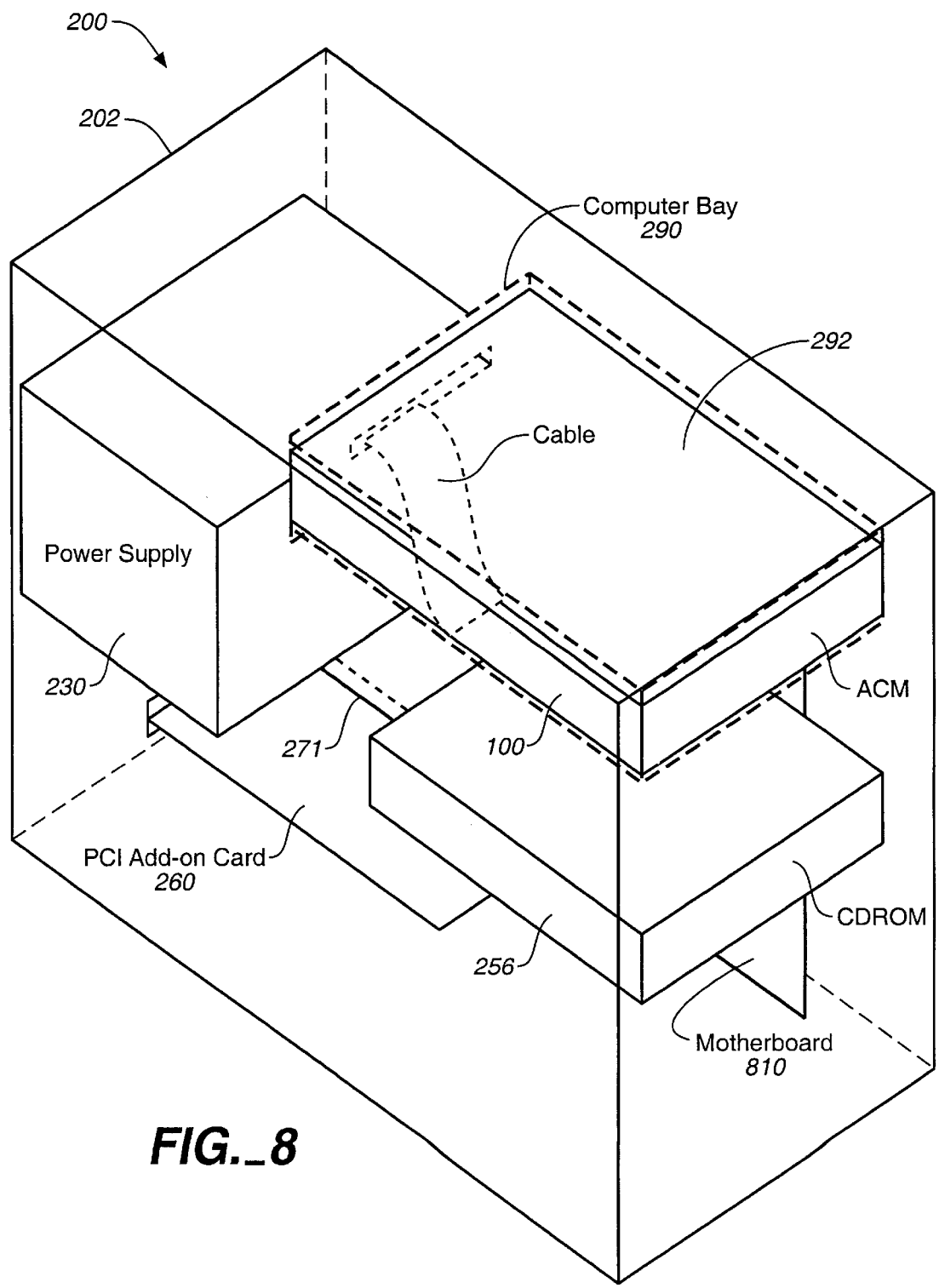
FIG._8

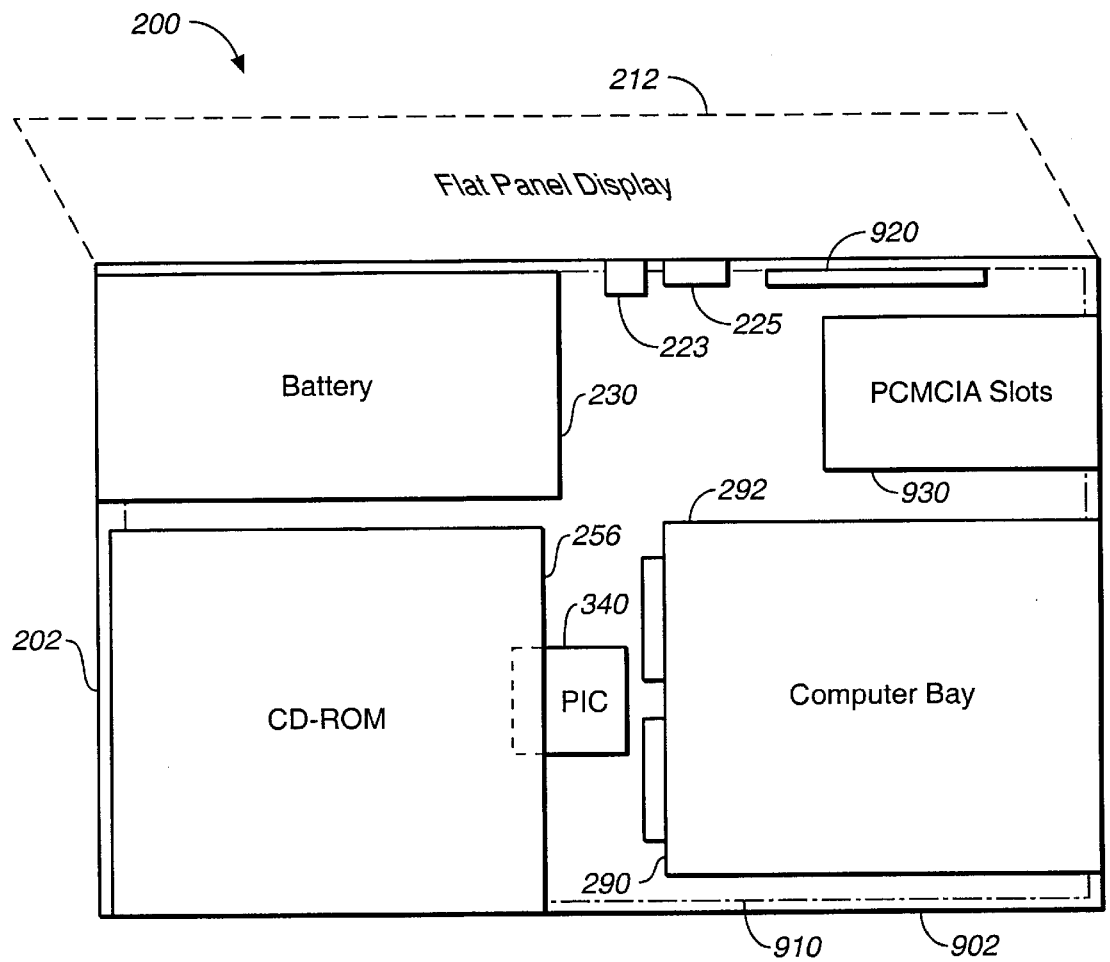
FIG._9

PERSONAL COMPUTER PERIPHERAL CONSOLE WITH ATTACHED COMPUTER MODULE

CROSS-REFERENCE TO RELATED APPLICATIONS

This application claims any and all benefits as provided by law of U.S. Provisional Application No. 60/083,886 filed May 1, 1998 and of U.S. Provisional Application No. 60/092,706 filed Jul. 14, 1998.

This application is being filed concurrently with the application of William W. Y. Chu for "A Communication Channel and Interface Devices For Bridging Computer Interface Buses", U.S. application No. 09/149,882 filed on Sept. 8, 1998 and incorporates the material therein by reference

BACKGROUND OF THE INVENTION

1. Field of the Invention

The invention relates to the field of personal computers. In particular, the invention relates to a personal computer comprising a computing module that attaches to a mating peripheral console.

2. Description of Related Art

Most computer systems are designed as standalone, self-contained units. A personal computer (PC) is constructed with a motherboard, enclosed within a case, acting as the central circuit board that connects all devices together including the central processing unit (CPU), system memory, graphics devices, audio devices, communications devices, a power supply, hard disk drive, floppy disk drive, add-on cards, and others. While some components may be exposed to the exterior of the case for easy substitution and replacement, such as removable diskette drives or PCMCIA cards for a notebook computer, the CPU is fixed within the case. A new generation of processor "modules," such as Intel's Mobile CPU module, contain the CPU and certain support circuitry within a pluggable module, but the module is directly attached to the motherboard, enclosed within the computer case, and removed only for servicing. As such, the CPU, which is an expensive component of the computer, cannot be readily utilized apart from the system in which it is installed.

Improved modular designs for personal computer systems have been suggested in the past. U.S. Pat. No. 5,539,616 (Kikinis) shows a notebook computer comprised almost entirely of pluggable modules. This design wins the advantages most often associated with modularity, i.e., flexibility in configuration and ease of servicing. At this level of modularity, however, no single module is sufficient in itself to preserve the core computing capability and environment of the computer user.

Another approach to personal computer modularity suffers from the same shortcoming. The recently developed Device Bay standard defines a mechanism for easily adding and upgrading PC peripheral devices without opening the computer case. Device Bay supports a wide variety of storage devices. The Device Bay standard supports only peripheral devices, however, and not CPU or memory modules.

Notebook computers with docking stations represent a partitioning of PC components that permits the core computing capability and environment of the user to be isolated to a portable physical package, i.e., the notebook computer. The notebook is self-contained and fully able to operate apart from any docking station, having all core computing capability plus primary input and display devices integrated into a single package. The docking station is an optional accessory that may be used to hold secondary or bulky peripheral devices.

The portability of notebook computers is, however, constrained by several factors. As a fully functional computer system, a notebook computer requires a substantial power supply. Batteries and AC adapters are both heavy limiting the ability to produce a device that is lightweight. A notebook computer also supplies primary input and display devices for the user. Usable keyboards and readable display screens limit the ability to produce a device with small dimensions that can support the software applications most commonly used on personal computers.

The most significant partitioning of a desktop personal computer occurs in the IBM Aptiva S Series. The Aptiva S PC's incorporate a system tower with a physically separate media console connected by a bus cable. The media console contains frequently accessed peripherals, such as CD-ROM and diskette drives, and has a connection for the keyboard and mouse. This construction removes the bulky tower case from the desktop by locating a small set of low performance peripherals near the monitor, as much as six feet away from the tower. The major components of the system, including the CPU, memory, hard disk drive, add-on cards, power supply, etc., remain together in the tower case.

Consequently, there is a need in the art for a personal computer that allows the user to localize their core computing power and software environment in a small, lightweight, single, portable, physical package.

SUMMARY OF THE INVENTION

A personal computer system comprising two physically separate units and the interconnection between them is disclosed. The first unit, an attached computing module (ACM), contains the core computing power and environment for a computer user. The second unit, a peripheral console (PCON), contains the power supply and primary input and output devices for the computer system. An ACM and a PCON are coupled with one another to form a fully functional personal computer system.

The ACM is small in size so as to be easily transported between work locations or to a servicing facility. The ACM is of comparable size to that of a videocassette, and similarly has a hard shell to provide mechanical protection for its internal components. The core computing power in the ACM comprises the central processing unit (CPU), system memory, any auxiliary processors, and primary mass storage (e.g., a hard disk drive) which serves as the boot device for the computer system. The user's core environment contained in the ACM comprises the primary operating system software files, frequently used application software files, files containing the user's working data, and stored configuration data that controls various aspects of software operation customized to the user's characteristics or preferences. Notably absent from the ACM are any substantial power supply, and any substantial input/output device such as would normally be used by the computer operator to interact and exploit the range of functionality provided by the operating system and application software.

The PCON provides the remaining components of a personal computer system including substantial power supply and input/output devices. Different PCON designs provide different usage possibilities for the user's core computing power and environment. Example PCON's include desktop computer, notebook computer, notepad computer, and computer-based entertainment computer designs.

To form a fully operational computer system, an ACM is coupled with a PCON. The plug-in module design of the ACM, and the concentration of high-value components therein (both in terms of high-value hardware and high-value files), makes it easy for a user to transport the high-value core between multiple PCON's, each of which can enjoy a relatively low cost. The concentration of a user's core computing environment in a small, portable package also makes it possible for large organizations to perform moves, adds, and changes to personal computer systems with greater efficiency.

These and other purposes and advantages of the present invention will become more apparent to those skilled in the art from the following detailed description in conjunction with the appended drawings.

BRIEF DESCRIPTION OF THE DRAWINGS

FIG. 1 depicts an exemplary desktop peripheral console and attached computing module.

FIGS. 2a through 2d depict various peripheral console configurations.

FIG. 3 is a block diagram of one embodiment of a computer system employing the present invention.

FIG. 4 is a block diagram of an attached computing module (ACM).

FIG. 5 illustrates an external view of one embodiment of an ACM.

FIG. 5b illustrates one possible embodiment of a computer bay.

FIG. 6 illustrates the internal component layout for one embodiment of an ACM.

FIG. 7 is a block diagram of a peripheral console (PCON).

FIG. 8 depicts internal major component placement for one tower desktop peripheral console (PCON).

FIG. 9 depicts internal component placement for one notebook peripheral console (PCON).

In the figures just described, like parts appearing in multiple figures are numbered the same in each figure.

DETAILED DESCRIPTION

FIG. 1 depicts an exemplary desktop peripheral console and attached computing module. The desktop peripheral console (PCON) looks similar to a desktop PC system unit of conventional design. Front covers for device bays and a diskette drive are visible on the front panel of the PCON. The PCON also provides connections for a display monitor, a keyboard, and a mouse.

The front panel of the PCON also displays an opening to a computer bay 292. The computer bay acts as the receptacle for the attached computer module (ACM). The ACM houses the core computing power and environment for a particular user and is inserted into the opening of the computer bay to receive power and to interact with the peripheral devices housed in the PCON. The ACM achieves normal operational capability when mated with a PCON. Because the ACM does not contain a primary power supply or primary input or output devices, it can be small and lightweight. These characteristics make the ACM greatly portable. It can be easily carried in a briefcase with other matter and is thus ideal for transport between home and office, or multiple office locations, each equipped with a desktop PCON. This represents one advantage of the present invention.

The design of peripheral consoles (PCON's) is in no way limited to the desktop unit as pictured in FIG. 1. FIGS. 2a through 2d depict various peripheral console configurations. FIG. 2a depicts a tower desktop PCON configuration. The opening of the computer bay 292 is visible at the front of the PCON unit. The PCON provides support for a video monitor as the user's primary display device. The PCON also provides support for a keyboard and a mouse as the user's primary input (text and pointing) devices.

FIG. 2b depicts a notebook computer PCON configuration. The opening of the computer bay 292 is visible at the side of the PCON unit. The PCON provides an integrated LCD display panel as the user's primary display device. The PCON provides an integrated keyboard as the user's primary input device.

FIG. 2c depicts a notepad computer PCON configuration. The opening of the computer bay 292 is visible along the back side of the PCON unit. The PCON provides an integrated LCD display panel as the user's primary display device. The display panel may be equipped with touch sensitivity to serve as the user's primary input device. The stylus may be used to enter text or graphics, or to select "soft" buttons, on the touch sensitive screen. Software accessible mechanical switches serve as an alternative primary input mechanism.

FIG. 2d depicts an entertainment PCON configuration. The opening of the computer bay 292 is visible at the front side of the PCON unit. The PCON provides an integrated television screen as the user's primary display device. A remote control keypad serves as the user's primary input device.

FIG. 3 is a block diagram of the components in one computer system employing the present invention. The computer system comprises an attached computer module (ACM), a peripheral console (PCON), and the interconnection apparatus between them. The ACM includes the central processing unit (CPU) 110, system memory 120, high performance devices 150, primary mass storage 130, and related interface and support circuitry 140. The PCON includes primary display 210, primary input 220, secondary mass storage 250, other devices 260, expansion slots 270, the primary power supply 230, and related interface and support circuitry 240. The interconnection apparatus 300 includes circuitry to convey power and operational signals between the ACM and PCON.

Within the ACM 100, the CPU 110 executes instructions and manipulates data stored in the system memory. The CPU 110 and system memory 120 represent the user's core computing power. The core computing power may also include high performance devices 150 such as advanced graphics processor chips that greatly increase overall system performance and which, because of their speed, need to be located close to the CPU. The primary mass storage 130 contains persistent copies of the operating system software, application software, configuration data, and user data. The software and data stored in the primary mass storage device represent the user's computing environment. Interface and support circuitry 140 primarily includes interface chips and signal busses that interconnect the CPU, system memory, high performance devices, and primary mass storage. The interface and support circuitry also connects ACM-resident components with the ACM-to-PCON interconnection apparatus as needed.

Within the PCON 200, the primary display component 210 may include an integrated display device or connection circuitry for an external display device. This primary display device may be, for example, an LCD, plasma, or CRT display screen used to display text and graphics to the user for interaction with the operating system and application software. The primary display component is the primary output of the computer system, i.e., the paramount vehicle by which programs executing on the CPU can communicate toward the user.

The primary input component 220 of the PCON may include an integrated input device or connection circuitry for attachment to an external input device. The primary input may be, for example, a keyboard, touch screen, keypad, mouse, trackball, digitizing pad, or some combination thereof to enable the user to interact with the operating system and application software. The primary input component is the paramount vehicle by which programs executing on the CPU receive signals from the user.

The PCON may contain secondary mass storage 250 to provide additional high capacity storage for data and software. Secondary mass storage may have fixed or removable media and may include, for example, devices such as diskette drives, hard disks, CD-ROM drives, DVD drives, and tape drives.

The PCON may be enhanced with additional capability through the use of integrated "Other Devices" 260 or add-on cards inserted into the PCON's expansion slots 270. Examples of additional capability include sound generators, LAN connections, and modems. Interface and support circuitry 240 primarily includes interface chips, driver chips, and signal busses that interconnect the other components within the PCON. The interface and support circuitry also connects PCON-resident components with the ACM-to-PCON interconnection apparatus as needed.

Importantly, the PCON houses the primary power supply 230. The primary power supply has sufficient capacity to power both the PCON and the ACM 100 for normal operation. Note that the ACM may include a secondary "power supply" in the form, for example, of a small battery. Such a power supply would be included in the ACM to maintain, for example, a time-of-day clock, configuration settings when the ACM is not attached to a PCON, or machine state when moving an active ACM immediately from one PCON to another. The total energy stored in such a battery would, however, be insufficient to sustain operation of the CPU at its rated speed, along with the memory and primary mass storage, for more than a fraction of an hour, if the battery were able to deliver the required level of electrical current at all.

FIG. 4 is a block diagram of an attached computing module (ACM) 100. The physical ACM package 100 contains the ACM functional components 101 and the ACM side of the ACM-to-PCON Interconnection 300. The ACM 101 comprises a CPU component 110, a system memory component 120, a primary mass storage component 130, a high performance devices components 150, and an interface and support component 140.

The ACM side of the ACM-to-PCON Interconnection 300 comprises a Host Interface Controller (HIC) component 320 and an ACM connector component 330. The HIC 320 and connector 330 components couple the ACM functional components 100 with the signals of an ACM-to-PCON interface bus 310 used to operatively connect an ACM with a PCON. The ACM-to-PCON interface bus 310 comprises conveyance for electrical power 314 and signals for a peripheral bus 312, video 316, video port 317, and console type 318. The preferred ACM-to-PCON Interconnection 300 is described in detail in a companion U.S. patent application, Ser. No. 09/149,882, entitled "A Communication Channel and Interface Devices for Bridging Computer Interface Buses," by the same inventor, filed on the same day herewith, and hereby incorporated by reference. The preferred ACM-to-PCON interconnection 300 includes circuitry to transmit and receive parallel bus information from multiple signal paths as a serial bit stream on a single signal path. This reduces the number of physical signal paths required to traverse the interconnection 300. Further, employing low-voltage differential signaling (LVDS) on the bit stream data paths provides very reliable, high-speed transmission across cables. This represents a further advantage of the present invention.

The CPU component 110 of the ACM functional circuitry 101 of the presently described embodiment comprises a microprocessor 112, which is the chief component of the personal computer system, power supply connection point 113, and cache memory 114 tightly coupled to the microprocessor 112 by the CPU-to-cache bus 174 comprising signal paths for address, data, and control information. The microprocessor 112 of this embodiment is one of the models from the Pentium II family of processors from Intel Corporation. Microprocessor 112 receives electrical power from power bus 168 via connection point 113. Microprocessor 112 couples to the Host Interface Controller (HIC) 320 via CPU-to-HIC bus 163 comprising signal paths to exchange control information such as an interrupt request. Microprocessor 112 also couples to CPU Bridge 146 via CPU main bus 164 comprising signal paths for address, data, and control information.

The CPU Bridge component 146 of the interface and support circuitry 140 operates to couple the high speed CPU main bus 164 to specialty buses of varying speeds and capability that connect other computer components. The CPU Bridge of the presently described embodiment incorporates memory controller circuitry, advanced graphics processor support circuitry, and a general, industry-standard PCI bus controller in a single package. A CPU Bridge 146 such as the 82443LX PCI/AGP Controller from Intel Corporation may be used.

The system memory component 120 of the ACM functional circuitry 101 in the present embodiment comprises main system memory (RAM) 122, BIOS memory 124, and flash memory 126. The system memory 120 is used to contain data and instructions that are directly addressable by the CPU. The RAM 122 comprises volatile memory devices such as DRAM or SDRAM memory chips that do not retain their stored contents when power is removed. This form of memory represents the largest proportion of total system memory 120 capacity. The BIOS memory 124 comprises non-volatile memory devices such as ROM or EPROM memory chips that retain their stored contents regardless of the application of power and are read-only memory under normal operating conditions. The BIOS memory 124 stores, for example, start-up instructions for the microprocessor 112 and sets of instructions for rudimentary input/output tasks. The flash memory 126 comprises non-volatile memory devices that retain their stored contents regardless of the application of power. Unlike the BIOS non-volatile memory, however, the stored contents of the flash memory 126 are easily changed under normal operating conditions. The flash memory 126 may be used to store status and configuration data, such as security identifiers or ACM specifications like the speed of the microprocessor 112. Some embodiments may combine the BIOS functions into the flash memory device, thus permitting BIOS contents to be rewritten, improving field upgradability.

The main system memory (RAM) 122 is coupled to memory controller circuitry resident within the CPU Bridge 146 via direct memory bus 165. The BIOS 124 and flash memory 126 are coupled to HIC 320 via switched memory bus 166. This permits the BIOS 124 and flash 126 memories to be accessed by circuitry in the HIC 320 or other circuitry connected thereto. The direct memory bus 165 and the switch memory bus 166 each comprises conductors to convey signals for data, address, and control information.

The primary mass storage component 130 of the ACM functional circuitry 101 in the present embodiment comprises a compact hard disk drive with an industry-standard, IDE interface. The hard disk drive (HDD) 132 has a formatted storage capacity sufficient to contain an operating system for the computer, application software desired by the user, and related user configuration and operating parameter data. The HDD 132 in the present embodiment serves as the "boot" device for the personal computer from which the operating system is loaded into RAM 122 by the start-up program stored in the BIOS 124.

The present HDD 132 has a capacity of approximately 2,000 megabytes to provide adequate storage for common software configurations and reasonable space for user data. One example of a common software configuration includes the Windows 95 operating system from Microsoft Corporation, a word processing program, a spreadsheet program, a presentation graphics program, a database program, an email program, and a web browser such as Navigator from Netscape Corporation. The hard disk 132 stores program and data files for each software component, including files distributed by the vendor as well as files created or updated by operation of the software after it is installed. For example, a word processor program may maintain information about a user's identity and latest preferences in an operating system registry file. Or, for example, the web browser may maintain a file of the user's favorite web sites or most recently viewed web pages. An HDD with 2000 megabyte capacity is readily available in the small size of hard disk (e.g., 2.5-inch or 3.5-inch) to minimize the space required within the ACM for the primary mass storage device 130.

The HDD 132 is coupled to IDE controller circuitry 148 via IDE bus 172. The IDE controller circuitry 148 is coupled to the CPU Bridge 146 via the Host PCI bus 167. IDE controllers and busses, and the PCI bus are well known and understood in the industry. The above components operate together to couple the hard disk drive 132 to the microprocessor 112.

The high performance devices component 150 of the ACM functional circuitry 101 in the present embodiment comprises an Advanced Graphics Processor (AGP) 152. The Model 740 Graphics Device from Intel Corporation may be used in the present embodiment as the AGP.

Increases in computer screen size, graphics resolution, color depth, and visual motion frame rates, used by operating system and application software alike, have increased the computing power required to generate and maintain computer screen displays. An AGP removes a substantial portion of the graphics computing burden from the CPU to the specialized high-performance processor, but a high level of interaction between the CPU and the specialized processor is nonetheless required. To maximize the effective contribution of having a specialized processor in the presently described embodiment, the AGP 152 is located in the ACM 100, where it is in close proximity to the microprocessor 112. The AGP 152 is coupled to the microprocessor 112 via the advanced graphics port bus 173 of the CPU Bridge 146. The visual display signal generated by the AGP are conveyed toward actual display devices at the peripheral console (PCON) via video signal bus 170. Video information from a source external to the ACM and appearing as video port signals 317 may be conveyed to the AGP 152 via video port signal path 171.

Other types of high performance components may be included in different ACM configurations. For example, an interface to an extremely high speed data communication facility may be desirable in some future computer where CPU-to-network interaction is of comparable intensity to today's CPU-to-graphics interaction. Because such high performance components tend to be high in cost, their inclusion in the ACM is desirable. Inclusion of high cost, high performance components in the ACM concentrates a user's core computing power and environment in a portable package. This represents a further advantage of the invention.

The interface and support component 140 of the ACM functional circuitry 101 in the present embodiment comprises circuitry for power regulation 142, clocking 144, CPU Bridge 146, IDE controller 148, and signal conveyance paths 161–174. The CPU Bridge 146 couples the CPU component 110 of the ACM 100 with the other components of the ACM 120–150 and the CPU-to-PCON Interconnection 300. The CPU Bridge 146 and IDE controller 148 have already been discussed. Power regulation circuitry 142 receives electrical power via the electrical power conduction path 314 of the CPU-to-PCON Interconnection 300, conditions and distributes it to the other circuitry in the ACM using power distribution bus 168. Such regulation and distribution is well known and understood in the art.

Clocking circuitry 144 generates clock signals for distribution to other components within the ACM 100 that require a timing and synchronization clock source. The CPU 110 is one such component. Often, the total power dissipated by a CPU is directly proportional to the frequency of its main clock signal. The presently described embodiment of the ACM 100 includes circuitry that can vary the frequency of the main CPU clock signal conveyed to the CPU via signal path 162, in response to a signal received from the host interface controller (HIC) 320 via signal path 161. The generation and variable frequency control of clocking signals is well understood in the art. By varying the frequency, the power consumption of the CPU (and thus the entire ACM) can be varied.

The variable clock rate generation may be exploited to match the CPU power consumption to the available electrical power. Circuitry in the host interface controller (HIC) 320 of the presently described embodiment adjusts the frequency control signal sent via signal path 161 to the clocking circuitry 144, based on the "console type" information signal 318 conveyed from the peripheral console (PCON) by the CPU-to-PCON interconnection 300. In this arrangement, the console type signal originating from a desktop PCON, such as depicted in FIG. 2a, would result in the generation of a maximum speed CPU clock. The desktop PCON, presumably has unlimited power from an electrical wall outlet and does not need to sacrifice speed for power conservation. The console type signal originating from a notebook PCON, such as depicted in FIG. 2b, would, however, result in the generation of a CPU clock speed reduced from the maximum in order to conserve battery power and extend the duration of computer operation obtained from the energy stored in the battery. The console type signal originating from a notepad PCON, such as depicted in FIG. 2c, would result in the generation of a CPU clock speed reduced further yet, the notepad PCON presumably having smaller batteries than the notebook PCON. Inclusion of control signals and circuitry to effect a CPU clock signal varying in frequency according to characteristics of the PCON to which the ACM is connected facilitates the movement of the user's core computing power and environment to different work settings, which is a further advantage of the present invention.

FIG. 5 illustrates an external view of one embodiment of an ACM. The case 510 of the ACM 100 is generally rectangular in shape, preferably constructed of a strong, lightweight, rigid material that will protect the internal components from mechanical and environmental exposure. Plastics may readily be used to construct the case 510. The case 510 completely surrounds the internal components, being generally an 8-sided box. FIG. 5 shows the top 512, right 514, and rear 516 surfaces of the ACM case 510. Rear edges 518 of the case joining the rear surface 516 with its adjoining surfaces may be beveled or rounded to facilitate insertion of the ACM 100 into the computer bay of the PCON. Notches 540 may be formed by projecting small surfaces inward from otherwise generally flat surfaces of the ACM case 510. The notches 540 may be used to engage with mechanical devices mounted in and about a computer bay. Such mechanical devices can be employed to secure the ACM into position within a computer bay for reliability and security. Openings 517 are formed into the rear surface 516 of the ACM case 510 through which to project connectors 330a and 330b. In one embodiment the case 510 is approximately 5.75 inches wide by 6.5 inches deep by 1.6 inches high.

Connectors 330a and 330b are part of the ACM-to-PCON Interconnection as described earlier in reference to FIGS. 3 and 4. When the ACM 100 is inserted into the computer bay of a peripheral console (PCON), connectors 330a and 330b mate with corresponding connectors located at the rear of the computer bay to electrically couple the ACM with the PCON containing the computer bay. Details concerning the ACM-to-PCON Interconnection can be found in the U.S. patent application entitled "A Communication Channel and Interface Devices for Bridging Computer Interface Buses," already incorporated herein by reference. The connectors 330a and 330b used in one embodiment are connectors complying with the Device Bay industry standard as documented in "Device Bay Interface Specification," revision 0.85, Feb. 6, 1998. Such connectors have specifically been designed to stand up to the rigors of repeated insertion and withdrawal.

Cooling plate 530 forms part of the top surface 512 of ACM 100. The cooling plate 530 may be mounted to, or project through an opening formed in, case 510. Similarly, electromagnetic interference (EMI)/electrostatic discharge (ESD) grounding plate 532 forms part of the right surface 514 of ACM 100. The grounding plate 532 may be mounted to, or project through an opening formed in, case 510. Cooling plate 530 and grounding plate 532 compressively mate with counterparts when the ACM is fully inserted into the computer bay. The counterparts located along the boundaries of the computer bay conduct dangerous heat and electrical charges away from the ACM. Inside the ACM, cooling plate 530 thermally couples to heat-sensitive components such as CPU 110 by methods well known in the art. Similarly, grounding plate 532 electrically couples to EMI/ESD-sensitive components, such as a microprocessor, by methods well known in the art.

LCD display 550 forms part of the right surface 514 of ACM 100. The LCD display may be mounted to, or project through an opening formed in, case 510. The LCD display may contain indicators about the status of the ACM. Such indicators may display, for example, the time-of-day from a time-of-day clock contained within the ACM, or the amount of charge remaining in an ACM-resident battery, or certain configuration options recorded in flash memory. The LCD display 550 provides display capability for a limited amount of information, most useful when the ACM is separated from a PCON (and is thus separated from a full-capability, primary display device).

FIG. 5b illustrates one possible embodiment of a computer bay. A computer bay 290 acts as a receptacle for lodging an ACM (such as the one shown in FIG. 5) within a desktop PCON. The illustrated computer bay 290 provides an ACM with housing and with signal flow, electrical grounding, heat transfer, and mechanical connections. While many physical arrangements between the ACM and PCON are possible, the use of an enclosed computer bay as the one illustrated in FIG. 5b offers many advantages. For example, the illustrated computer bay 290 provides physical protection for the ACM. The computer bay may also be easily incorporated into industry standard form factors used in the manufacture of desktop personal computers (e.g., the ACM and associated computer bay could be designed to fit within the volume occupied by a standard-size disk drive).

The computer bay 290 appearing in FIG. 5b is shown mounted within the confines of PCON case 202. The computer bay 290 comprises frame 291 and signal flow, grounding, cooling, and locking components as described below. Mounting flanges 298 of frame 291 may be used to attach the computer bay 290 to the PCON structure. The computer bay 290 is prominently defined by frame 291 generally forming a cavity in which to lodge an ACM. As such, the interior cavity formed by frame 291 closely approximates the exterior dimensions of a compatible ACM. The top 293, right 294, and rear 295 sides of the computer bay frame 291 are visible. The computer bay frame 291 also includes substantial bottom and left sides which are not shown. The front side of the frame 291 (not shown) is open to allow the insertion of the ACM. Frame 291 is constructed of metal for strength and to facilitate the conductance of heat and undesired electrical currents away from the ACM.

In the presently described embodiment, the weight of an inserted ACM is largely borne by the bottom side (not shown) of computer bay frame 291. Alternative embodiments are possible where, for example, the weight of the ACM is borne by rails running longitudinally down the right and left sides of the computer bay cavity that engage corresponding grooves running longitudinally down the right and left sides of an ACM.

The computer bay 290 includes a signal conductor component to carry electrical signals between the circuitry in the ACM and the circuitry in the PCON. The signal conductor component comprises connectors 362a and 362b and cables 364. The signal conductor component of the computer bay 290 is logically part of the interconnection apparatus represented in block 300 of FIG. 3.

The rear sections of connectors 362a and 362b are visible in FIG. 5b. When an ACM is operatively inserted into the computer bay 290, connectors 362a and 362b mate with corresponding connectors located at the rear of the ACM (e.g., connectors 330a and 330b of FIG. 5). The signals present on the pins of an inserted ACM's connectors are conducted to the corresponding pins of connectors 362a and 362b, and along corresponding conductors within cables 364, to other circuitry housed within PCON case 201.

Details concerning the ACM-to-PCON Interconnection can be found in the U.S. patent application entitled "A Communication Channel and Interface Devices for Bridging Computer Interface Buses," already incorporated herein by reference. The connectors 362a and 362b used in one embodiment are connectors complying with the Device Bay industry standard as documented in "Device Bay Interface Specification," revision 0.85, Feb. 6, 1998. Such connectors have specifically been designed to stand up to the rigors of repeated insertion and withdrawal.

The computer bay 290 includes an electrical grounding component comprising spring contact bands 620, opening 622, and a conductive path to a grounding source. The electrical grounding component of the computer bay 290 provides a mating mechanism for the grounding pad 532 (shown in FIG. 5) on an inserted ACM. As such, the position of opening 622 and spring contact bands 620 corresponds to the position of grounding plate 532 (shown in FIG. 5) for an ACM fully inserted into the computer bay. The bands 620 attach at their ends to side 294 of the computer bay 290 and are formed to project through opening 622 in the side 294 of the computer bay 290. The bands 620 project far enough through opening 622 so as to extend somewhat into the interior of the cavity into which an ACM is inserted. Spring contact bands 620 are constructed of an elastic, conductive material such as spring steel with a conductive coating. With an ACM inserted into the computer bay 290, elastic forces position contact bands 620 against the grounding plate of an inserted ACM and establish a conductive path to ground potential via the bands' connection to the metallic computer bay case 291 at ground potential. Alternatively, if the computer bay case 291 is not at ground potential, a dedicated wire (not shown) can be attached from a ground potential source directly to contact bands 620.

Similarly, the computer bay 290 includes a cooling component comprising heat sink 610, opening 611, mounting pads 612, and springs 614. The cooling component provides a mating mechanism for the cooling pad 530 (shown in FIG. 5) on an inserted ACM. Heat sink 610 is mounted to project into the interior of the computer bay cavity through opening 611 at the top 293 of computer bay 290. Elastic force from springs 614 positioned against mounting pads 612 hold heat sink 610 in firm physical and thermal contact with the cooling plate 530 (shown in FIG. 5) of an inserted ACM. Through effective thermal coupling between the ACM's cooling plate and the computer bay's heat sink, heat generated during operation can be conducted away from the ACM, via heat sink 610, to the interior of the PCON where air circulated by a cooling fan can dissipate the heat. Movable heat sink 610 may also be thermally coupled to computer bay case or frame 291 to provide greater heat-sinking mass and surface area for heat dissipation.

The computer bay 290 includes a locking component comprising latching arm 631, locking tip 631, opening 632, pivots 633 and 634, spring 635, mounting tab 636, release arm 637, and plate 638. The locking component operates to prevent egress of an inserted ACM from the computer bay 290. Locking tip 631 of the latching arm 630 projects into the computer bay cavity 299 through opening 632 in the side of computer bay 290. The locking tip 631 engages one of the notches 540 (shown in FIG. 5) formed into the case of an ACM when the ACM is inserted into the computer bay 290. The position of opening 632 and locking tip 631 thus corresponds to the position of a notch 540 (shown in FIG. 5) in the exterior case 510 of an operatively inserted ACM. The latching arm is pivoted at pin 633 with elastic tension from spring 635 urging locking tip 631 toward the interior of the computer bay cavity 299. The angled, frontward edge of locking tip 631 facilitates displacement of the locking tip toward the exterior of the computer bay when the solid portion of the ACM case 510 (shown in FIG. 5) to the rear of the notch 540 (shown in FIG. 5) is moving past locking tip 631 as the ACM is inserted into the bay 290.

Release arm 637 is pivotally connected by pin 634 to latching arm 630. Rearward pressure on release arm 637, such as from a computer operator depressing a front panel button (not shown) attached to the front surface of plate 638, causes latching arm 630 to pivot about pin 633 in opposition to the force provided by spring 635. Sufficient rearward motion of release arm 637 causes locking tip 631 to disengage adequately from the cavity space 299 to permit removal of the ACM from the computer bay 290.

One skilled in the art recognizes that the motion of locking tip 631 could be restricted, controlled, or actuated by a variety mechanical or electrical means. For example, a mechanical lock could be coupled to locking tip 631 to prevent egress of the locking tip from the cavity 299 without a key. Similarly, an electrical actuator such as a solenoid, possibly under software control, could operate to disengage the locking tip 631 only after entry of a security password by the user. One skilled in the art recognizes that similar alternatives exist regarding many aspects of computer bay construction, and that these alternatives may be employed in varying embodiments without departing from the scope and spirit of the invention.

FIG. 6 illustrates the internal component layout for one embodiment of an ACM. All components are contained within the confines of the ACM case 510, except for connectors 330a and 330b which extend from the rear of the ACM 100 to engage mating connectors (not shown) that will couple the ACM circuitry with the PCON circuitry. Main circuit board 610 provides electrical connections for circuitry within the ACM and mounting for many of its components 124, 122, 126, 152, 142 148, 320, and 330. The fabrication and use of such circuits boards is well known and understood in the art. Connector 622 is also mounted on main circuit board 610 and mates with mobile processor module 620. Mobile processor module 620 represents a form of packaging for a microprocessor and related components. The illustrated mobile processor module 620 is a self-contained unit that includes a microprocessor 112, CPU cache 114, and CPU bridge 146 operatively interconnected by the manufacturer. An example of one such module is the Pentium Processor with MMX Technology Mobile Module from Intel Corporation (order number 24 3515-001, September 1997). One skilled in the art recognizes that discrete microprocessor, cache, and bridge could have been employed and mounted directly to the main circuit board.

The mobile processor module 620 blocks the view, from the top, of the system BIOS 124. Similarly, hard disk drive 132 hides RAM memory 122, the high performance graphics processor 152, the host interface controller 320, and flash memory 126. Memory upgrade socket 630 remains exposed to facilitate installation of additional RAM memory 122. Power regulator 142, like the memory upgrade socket, enjoys a generous amount of overhead clearance to accommodate its vertical size. The area including IDE controller 148 also enjoys overhead clearance to facilitate a cable connection with the hard disk drive 132.

The functional interconnection and operation of components contained within the ACM and depicted in FIG. 6 has already been described in relation to FIG. 4 for like numbered items appearing therein.

FIG. 7 is a block diagram of a peripheral console (PCON). A peripheral console couples with an ACM to form an operating personal computer system. The peripheral console (PCON) supplies an ACM with primary input, display, and power supply; the ACM supplies the core computing power and environment of the user. In the presently described embodiment the physical PCON package 200 contains the PCON functional components 201 and the PCON side of the ACM-to-PCON Interconnection 300. The PCON functional components 201 comprise primary display 210, a primary input 220, a primary power supply 230, interface and support 240, secondary mass storage 250, other devices 260, and expansion slots 270.

The PCON side of the ACM-to-PCON Interconnection 300 comprises a Peripheral Interface Controller (PIC) component 340, a PCON connector component 350, console-type component 342, and flash memory device 348. The PIC 340 and connector 350 components couple the PCON functional components 201 with the signals of an ACM-to-PCON interface bus 310 used to operatively connect an ACM with a PCON. The ACM-to-PCON interface bus 310 comprises conveyance for electrical power 314 and signals for a peripheral bus 312, video 316, video port 317, and console-type 318. The preferred ACM-to-PCON Interconnection 300 is described in detail in the U.S. patent application entitled "A Communication Channel and Interface Devices for Bridging Computer Interface Buses," already incorporated herein by reference.

Connector component 350 may be selected to mate directly with the connector component 330 of an ACM (shown in FIG. 4). Alternatively, connector component 350 may be selected to mate with, for example, the connector on one end of a cable intervening between the PCON and an ACM in a particular embodiment, such as cable 364 shown in FIG. 5B. The ACM-to-PCON interconnection described in the aforementioned companion patent application has the advantage of providing reliable signal conveyance across low cost cables.

Flash memory device 348 provides non-volatile storage. This storage may be accessible to devices in both the ACM and the PCON, including the host interface controller and the peripheral interface controller to which it is connected. As such, flash memory 348 may be used to store configuration and security data to facilitate an intelligent mating between an ACM and a PCON that needs no participation of the CPU.

The primary display component 210 of the PCON functional circuitry 201 of the presently described embodiment comprises integrated display panel 212 and video connector 213. Integrated display panel 212 is a color LCD display panel having a resolution of 640 horizontal by 480 vertical pixels. 640-by-480 resolution is popularly considered to be the minimum screen size to make practical use of the application software in widespread use today. One skilled in the art recognizes that the type and resolution of the display can vary greatly from embodiment to embodiment, depending on factors such as cost and intended application. Any display device may be used, without departing from the scope and spirit of the invention, that provides principal visual output to the computer user for operating system and application software executing in its customary and intended fashion using the CPU component (110 of FIG. 3) of an ACM presently coupled to PCON 200.

Integrated display panel 212 is coupled to video signal bus 249 and displays a screen image in response to video signals presented on bus 249. Certain pins of connector 350 receive video output signals 316 of the ACM-to-PCON interface bus 310 from a mated connector that is coupled to an ACM. These certain pins of connector 350 couple to video signal bus 249 which conveys the video output signals 316 throughout the PCON 200 as needed. Video connector 213 is exposed at the exterior of PCON 200 and couples to video signal bus 249. Connector 213 permits easy attachment of an external display device that is compatible with the signals carried by bus 249, such as a CRT monitor (not shown). The external display device may be used in addition, or as an alternative, to integrated display panel 212.

The isolation of the relatively heavy and sizable primary display 210 from the core computing power and user environment contained within an ACM represents a further advantage of the present invention.

The primary input component 220 of the PCON functional circuitry 201 of the presently described embodiment comprises keyboard interface circuitry 222, keyboard connector 223, pointer interface circuitry 224, and pointer connector 225. Keyboard interface circuitry 222 and pointer interface circuitry 224 connect to ISA bus 245 and are thereby coupled to the CPU component (110 of FIG. 3) of any ACM attached to PCON 200. Keyboard interface circuitry 222 interfaces a standard computer keyboard (not shown), attached at connector 223, to ISA bus 245. Pointer interface circuitry 222 interfaces a standard computer pointing device (not shown), such as a computer mouse attached at connector 225, to ISA bus 245. Computer keyboards, pointing devices, connectors 223, 225, keyboard interface circuitry 222, and pointer interface circuitry 224 are well known in the art. The isolation of the relatively heavy and sizable primary input devices 220 from the core computing power and user environment contained within an ACM represents a further advantage of the present invention.

The primary power supply component 230 of the PCON functional circuitry 201 of the presently described embodiment provides electrical energy for the sustained, normal operation of the PCON 200 and any ACM coupled to connector 350. The power supply may be of the switching variety well known in the art that receives electrical energy from an AC source 289, such as a wall outlet. Power supply 230 reduces the alternating current input voltage, to a number of distinct outputs of differing voltages and current capacities. The outputs of power supply 230 are applied to power bus 231. Power bus 231 distributes the power supply outputs to the other circuitry within the PCON 200. Bus 231 also connects to certain pins of connector 350 to provide the electrical power 314 for an ACM conveyed by ACM-to-PCON interconnection 300. The isolation of the usually heavy power supply 230 from the core computing power and user environment contained within the ACM represents a further advantage of the present invention.

The interface and support component 240 of the PCON functional circuitry 201 of the presently described embodiment comprises peripheral bridge 246, diskette controller 242, IDE controller 248, and signal conveyance paths 241, 243, 244, 245, 247 and 249. Peripheral bridge 246 couples PCI peripheral bus 241 with peripheral busses of other formats such as ISA peripheral bus 245 and others 247. PCI and ISA peripheral busses are industry standards, well known and understood in the art. Other peripheral busses 247 may include, for example, a bus compliant with the universal serial bus (USB) industry standard. While other embodiments of a peripheral console 200 may include a single peripheral bus that is coupled to an attached ACM via ACM-to-PCON interconnection 300, such as PCI bus 241, this embodiment includes peripheral bridge 246 to establish additional busses 245, 247. The additional busses 245, 247 permit the use of the many low-cost and readily available components compatible with these bus specifications.

Diskette controller 242 interfaces a floppy disk drive 254 with the CPU component 110 of an attached ACM (shown in FIG. 4) so that the CPU may control and use the diskette drive 254 hardware to store and retrieve data. Diskette controller 242 couples to the CPU via a connection to ISA bus 245. Diskette controller 242 connects to the diskette drive 254 via one of device cables 243.

Similarly, IDE controller 248 interfaces a hard disk drive 252 and a CDROM drive 256 with the CPU component 110 of an attached ACM (shown in FIG. 4) so that the CPU may control and use the hard disk drive 252 and CDROM 256 hardware to store and retrieve data. IDE controller 248 couples to the CPU via connection to PCI peripheral bus 241. IDE controller 248 connects to each of hard disk drive 252 and CD-ROM drive 256 via one of device cables 243. Some embodiments of PCON 200 may take advantage of VLSI integrated circuits such as an 82371SB (PIIX4) integrated circuit from Intel Corporation. An 82371SB integrated circuit includes circuitry for both the peripheral bridge 246 and the IDE controller 248 in a single package.

The secondary mass storage component 250 of the PCON functional circuitry 201 of the presently described embodiment comprises diskette drive 254, hard disk drive 252, and CD-ROM drive 256. Secondary mass storage 250 generally provides low-cost, non-volatile storage for data files which may include software program files. Data files stored on secondary mass storage 250 are not part of a computer user's core computing power and environment. Secondary mass storage 250 may be used to store, for example, seldom used software programs, software programs that are used only with companion hardware devices installed in the same peripheral console 200, or archival copies of data files that are maintained in primary mass storage 150 of an ACM (shown in FIG. 4). Storage capacities for secondary mass storage 250 devices may vary from the 1.44 megabytes of the 3.5-inch high density diskette drive 254, to more than 10 gigabytes for a large format (5-inch) hard disk drive 252. Hard disk drive 252 employs fixed recording media, while diskette drive 254 and CD-ROM drive 256 employ removable media. Diskette drive 254 and hard disk drive 252 support both read and write operations (i.e., data stored on their recording media may be both recalled and modified) while CD-ROM drive 256 supports only read operations.

The other devices component 260 of the PCON functional circuitry 201 of the presently described embodiment comprises a video capture card. A video capture card accepts analog television signals, such as those complying with the NTSC standard used for television broadcast in the United States, and digitizes picture frames represented by the analog signal for processing by the computer. Video capture cards at present are considered a specialty, i.e., not ubiquitous, component of personal computer systems. Digitized picture information from video capture card 260 is carried via signal conveyance path 244 to the peripheral interface controller 340 which transforms it to the video port signals 317 of the ACM-to-PCON interconnection 300 for coupling to the advanced graphics processor 152 in an attached ACM (shown in FIG. 4).

Video capture card 260 is merely representative of the many types of "other" devices that may be installed in a PCON to expand the capabilities of the personal computer. Sound cards and laboratory data acquisition cards are other examples. Video capture card 260 is shown installed in one of expansion slots 270 for coupling to the interface and control circuitry 240 of the PCON. Any of other devices 260 could be coupled to the interface and control circuitry 240 of the PCON by different means, such as direct installation on the circuit board that includes the interface and control circuitry 240; e.g., a motherboard.

The expansion slots component 270 of the PCON functional circuitry 201 of the presently described embodiment comprises PCI connectors 271 and ISA connectors 272. A circuit card may be inserted into one of the connectors 271, 272 in order to be operatively coupled with the CPU 110 of an attached ACM (shown in FIG. 4). Each of connectors 271 electrically connects to PCI bus 241, and may receive and hold a printed circuit card which it electrically couples to PCI bus 241. Each of connectors 272 electrically connects to ISA bus 245, and may receive and hold a printed circuit card which it electrically couples to ISA bus 245. The PCI 241 and ISA 245 busses couple to the CPU 110 of an attached ACM (shown in FIG. 4) by circuitry already described.

FIG. 8 depicts internal major component placement for one tower desktop peripheral console (PCON). The components shown belong to desktop tower PCON 200 and are housed in PCON case 202, except for ACM 100. Motherboard 810 is mounted parallel to the right side of PCON case 202. This orientation is employed to comport with industry standard form factors for motherboards and desktop computer cases. Motherboard 810 provides mounting and interconnection for much of the circuitry of the PCON. For example, for the PCON embodiment illustrated in FIG. 7, PCON-side interconnection circuitry 300, interface and control circuitry 240, keyboard 222 and pointer 224 interface circuitry, and expansion slot 270 components, could all be installed on motherboard 810.

Computer bay 290 is mounted with its front opening exposed at the front face of PCON case 202 allowing easy insertion of ACM 100. The long edge of the front opening of computer bay 292 runs perpendicular to the plane of motherboard 810. This orientation is employed to comport with industry standard form factors for desktop computer cases. Cable 364 carries signals between the ACM 100 and motherboard 810 containing PCON-side interconnection circuitry (not specifically shown). Signals flow between cable 364 and ACM 100 over connectors 330, 362 mated when the ACM is inserted into the computer bay.

Because the rear face of computer bay 290 which holds connectors 362 runs perpendicular to the plane of motherboard 810, the use of a flexible cable simplifies the interconnection between them. Use of the interconnection apparatus disclosed in the U.S. patent application entitled "A Communication Channel and Interface Devices for Bridging Computer Interface Buses," already incorporated herein by reference, facilitates the use of flexible cable.

FIG. 8 also depicts CD-ROM 256, power supply 230, PCI expansion slot 271, and an "other device" 260, occupying positions that generally comport with form factors norms at use in the personal computer industry. Other Device 260 comprises a PCI expansion card plugged into PCI expansion slot 271.

FIG. 9 depicts internal component placement for one notebook peripheral console (PCON) such as the one illustrated in FIG. 2b. FIG. 9 shows a view from the top, with the hinged panel containing a display 212 opened as shown in FIG. 2b, and with the keyboard and other top surfaces of the base portion 902 removed to allow a view of the interior. Motherboard 910 sits low within the base portion 902 of the notebook PCON 200. The motherboard lies in a plane parallel to the bottom surface of the base portion 902. Motherboard 910 provides mounting and interconnection for circuitry elements such as Peripheral Interface Controller 340, keyboard connector 223, pointer connector 225, and LCD display panel connector 920, and many others that are not shown.

Computer bay 290, battery 230, CD-ROM 256, and PCMCIA slots 930 are placed above motherboard 910. Computer bay 290 has its "front" opening 292 exposed at the right side of the notebook PCON case 202 to permit side insertion of an ACM into the computer bay 292. CD-ROM drive 256 has its front face exposed at the front face of notebook PCON case 202 to permit easy insertion and removal of CD media. Battery 230 which serves as the primary power supply for notebook PCON has one face exposed at the left side of notebook PCON case 202 to facilitate insertion and removal of the battery 230. PCMCIA slots 930 are exposed at the right side of PCON case 202 to facilitate insertion and removal of PCMCIA cards into and from the slots 930.

PCMCIA cards are credit-card sized electronics modules that extend the functionality of a personal computer system. PCMCIA cards and slots are well known and understood in the art. A PCMCIA card may, for example, contain a modem or network interface electronics.

The keyboard (not shown) of notebook PCON 200 is placed in a plane generally parallel to Motherboard 910, toward the front edge of notebook PCON 200, and above CD-ROM 256 and computer bay 290.

Various modifications to the preferred embodiment can be made without departing from the spirit and scope of the invention. (A limited number of modifications have already been described in the preceding discussion.) For example, a particular embodiment may insert another layer of bus bridging between the CPU bridge and the Peripheral bridge. This may be desirable if, for example, a vendor wants to implement a proprietary, general-purpose bus having intermediate performance characteristics that fall between those of the high-performance general purpose bus originating at the CPU, and the slower general purpose PCI bus. Thus, the foregoing description is not intended to limit the invention as set forth.

In the claims:

1. A detachable computing module for attachment to a peripheral console for forming a fully operational computer system comprising:
    an enclosure;
    a CPU;
    a memory coupled to said CPU;
    a mass storage coupled to said CPU;
    interconnection circuitry coupled to said CPU, said interconnection circuitry connectable to a peripheral console; and
    clock circuitry having a variable frequency output signal coupled to said CPU, said clock circuitry varying the frequency of said output signal in response to a signal presented at an input coupled to said interconnection circuitry, said signal conveying at least one functional characteristic of a peripheral console
    wherein said CPU is uncoupled from any primary input circuitry when said interconnection circuitry is disconnected from a peripheral console.

2. The apparatus of claim 1 further comprising
    a cooling plate exposed to the exterior of said computing module and thermally coupled to said CPU.

3. The apparatus of claim 1 further comprising
    a grounding plate exposed to the exterior of said computing module and electrically coupled to an electrical ground connection of the CPU.

4. A detachable computing module for attachment to a peripheral console for forming a fully operational computer system comprising:
    an enclosure;
    a CPU;
    a memory coupled to said CPU;
    a mass storage coupled to said CPU;
    interconnection circuitry coupled to said CPU, said interconnection circuitry connectable to a peripheral console; and
    clock circuitry having a variable frequency output signal coupled to said CPU, said clock circuitry varying the frequency of said output signal in response to a signal presented at an input coupled to said interconnection circuitry, wherein said signal conveys at least one functional characteristic of a peripheral console;
    wherein said CPU is uncoupled from any primary output circuitry when said interconnection circuitry is disconnected from a peripheral console.

5. The apparatus of claim 4 further comprising
    a cooling plate exposed to the exterior of said computing module and thermally coupled to said CPU.

6. The apparatus of claim 4 further comprising
    a grounding plate exposed to the exterior of said computing module and electrically coupled to an electrical ground connection of the CPU.

7. A detachable computing module for attachment to a peripheral console for forming a fully operational personal computer system comprising:
    an enclosure;
    a CPU having a power supply connection point;
    memory coupled to said CPU;
    mass storage coupled to said CPU; and
    interconnection circuitry coupled to said CPU, said interconnection circuitry connectable to a peripheral console;
    wherein said power supply connection point of said CPU is uncoupled from any electrical power source having sufficient energy to sustain execution of instructions by said CPU whenever said interconnection circuitry is disconnected from a peripheral console.

8. The apparatus of claim 7 further comprising clock circuitry having a variable frequency output signal coupled to said CPU.

9. The apparatus of claim 8 wherein said clock circuitry varies the frequency of said output signal in response to a signal presented at an input coupled to said interconnection circuitry.

10. The apparatus of claim 9 wherein said signal presented at an input coupled to said interconnection circuitry conveys at least one functional characteristic of a peripheral console.

11. The apparatus of claim 7 further comprising a cooling plate exposed to the exterior of said computing module and thermally coupled to said CPU.

12. The apparatus of claim 7 further comprising a grounding plate exposed to the exterior of said computing module and electrically coupled to an electrical ground connection of the CPU.

13. The apparatus of claim 7 wherein said enclosure further comprises projections forming a notch for engaging a latching mechanism.

14. A detachable computing module for attachment to a peripheral console for forming a fully operational personal computer system comprising:

an enclosure;

a CPU;

memory coupled to said CPU;

mass storage coupled to said CPU;

interconnection circuitry coupled to said CPU, said interconnection circuitry connectable to a peripheral console; and power supply circuitry having a stored energy capacity no greater than the energy required to power said CPU, memory, and mass storage for 30 minutes of operation at the maximum rated speed of the CPU.

15. The apparatus of claim 14 further comprising clock circuitry having a variable frequency output signal coupled to said CPU.

16. The apparatus of claim 15 wherein said clock circuitry varies the frequency of said output signal in response to a signal presented at an input coupled to said interconnection circuitry.

17. The apparatus of claim 16 wherein said signal presented at an input coupled to said interconnection circuitry conveys at least one functional characteristic of a peripheral console.

18. The apparatus of claim 14 further comprising a cooling plate exposed to the exterior of said computing module and thermally coupled to said CPU.

19. The apparatus of claim 14 further comprising a grounding plate exposed to the exterior of said computing module and electrically coupled to an electrical ground connection of the CPU.

20. The apparatus of claim 14 wherein said enclosure further comprises projections forming a notch for engaging a latching mechanism.

21. A detachable computing module for attachment to a peripheral console for forming a fully operational personal computer system comprising:

an enclosure;

a CPU having a power supply connection point;

memory coupled to said CPU;

mass storage coupled to said CPU;

interconnection circuitry coupled to said CPU, said interconnection circuitry connectable to a peripheral console; and wherein said power supply connection point of said CPU conducts more than 20 percent of the power required for operation of the CPU at its maximum rated clock speed for no more than 30 minutes for any duration wherein said interconnection circuitry is continuously disconnected from a peripheral console.

22. The apparatus of claim 21 further comprising clock circuitry having a variable frequency output signal coupled to said CPU.

23. The apparatus of claim 22 wherein said clock circuitry varies the frequency of said output signal in response to a signal presented at an input coupled to said interconnection circuitry.

24. The apparatus of claim 23 wherein said signal presented at an input coupled to said interconnection circuitry conveys at least one functional characteristic of a peripheral console.

25. The apparatus of claim 21 further comprising a cooling plate exposed to the exterior of said computing module and thermally coupled to said CPU.

26. The apparatus of claim 21 further comprising a grounding plate exposed to the exterior of said computing module and electrically coupled to an electrical ground connection of the CPU.

27. The apparatus of claim 21 wherein said enclosure further comprises projections forming a notch for engaging a latching mechanism.

28. A detachable computing module for attachment to a peripheral console for forming a fully operational personal computer system comprising:

an enclosure;

a CPU having a power supply connection point;

memory coupled to said CPU;

mass storage coupled to said CPU; and interconnection circuitry coupled to said CPU, said interconnection circuitry connectable to a peripheral console;

clock circuitry having a variable frequency output signal coupled to said CPU, said clock circuitry varying the frequency of said output signal in response to a signal presented at an input coupled to said interconnection circuitry, said signal conveying at least one functional characteristic of a peripheral console; and a cooling plate exposed to the exterior of said computing module and thermally coupled to said CPU, wherein said power supply connection point of said CPU is uncoupled from any electrical power source having sufficient energy to sustain execution of instructions by said CPU whenever said interconnection circuitry is disconnected from a peripheral console.

29. A detachable computing module for attachment to a peripheral console for forming a fully operational personal computer system comprising:

an enclosure;

a CPU having a power supply connection point;

memory coupled to said CPU;

mass storage coupled to said CPU; and interconnection circuitry coupled to said CPU, said interconnection circuitry connectable to a peripheral console;

clock circuitry having a variable frequency output signal coupled to said CPU, said clock circuitry varying the frequency of said output signal in response to a signal presented at an input coupled to said interconnection circuitry, said signal conveying at least one functional characteristic of a peripheral console; and a grounding plate exposed to the exterior of said computing module and electrically coupled to an electrical ground connection of the CPU, wherein said power supply connection point of said CPU is uncoupled from any electrical power source having sufficient energy to sustain execution of instructions by said CPU whenever said interconnection circuitry is disconnected from a peripheral console.

30. A detachable computing module for attachment to a peripheral console for forming a fully operational personal computer system comprising: an enclosure; a CPU; a cooling plate exposed to the exterior of said computing module and thermally coupled to said CPU; memory coupled to said CPU; mass storage coupled to said CPU; interconnection circuitry coupled to said CPU, said interconnection circuitry connectable to a peripheral console; clock circuitry having a variable frequency output signal coupled to said CPU, said clock circuitry varying the frequency of said output signal in response to a signal presented at an input coupled to said interconnection circuitry, said signal conveying at least one functional characteristic of a peripheral console; and power supply circuitry having a stored energy capacity no greater than the energy required to power said CPU, memory, and mass storage for 30 minutes of operation at the maximum rated speed of the CPU.

31. A detachable computing module for attachment to a peripheral console for forming a fully operational personal computer system comprising: an enclosure; a CPU; a grounding plate exposed to the exterior of said computing module and electrically coupled to an electrical ground connection of the CPU, memory coupled to said CPU; mass storage coupled to said CPU; interconnection circuitry coupled to said CPU, said interconnection circuitry connectable to a peripheral console; clock circuitry having a variable frequency output signal coupled to said CPU, said clock circuitry varies the frequency of said output signal in response to a signal presented at an input coupled to said interconnection circuitry, said signal conveying at least one functional characteristic of a peripheral console; and power supply circuitry having a stored energy capacity no greater than the energy required to power said CPU, memory, and mass storage for 30 minutes of operation at the maximum rated speed of the CPU.

32. A detachable computing module for attachment to a peripheral console for forming a fully operational personal computer system comprising:

an enclosure;

a CPU having a power supply connection point;

a cooling plate exposed to the exterior of said computing module and thermally coupled to said CPU;

memory coupled to said CPU;

mass storage coupled to said CPU;

interconnection circuitry coupled to said CPU, said interconnection circuitry connectable to a peripheral console; and clock circuitry having a variable frequency output signal coupled to said CPU, said clock circuitry varying the frequency of said output signal in response to a signal presented at an input coupled to said interconnection circuitry, said signal conveying at least one functional characteristic of a peripheral console, wherein said power supply connection point of said CPU conducts more than 20 percent of the power required for operation of the CPU at its maximum rated clock speed for no more than 30 minutes for any duration wherein said interconnection circuitry is continuously disconnected from a peripheral console.

33. A detachable computing module for attachment to a peripheral console for forming a fully operational personal computer system comprising:

an enclosure;

a CPU having a power supply connection point;

a grounding plate exposed to the exterior of said computing module and electrically coupled to an electrical ground connection of the CPU;

memory coupled to said CPU;

mass storage coupled to said CPU;

interconnection circuitry coupled to said CPU, said interconnection circuitry connectable to a peripheral console; and clock circuitry having a variable frequency output signal coupled to said CPU, said clock circuitry varying the frequency of said output signal in response to a signal presented at an input coupled to said interconnection circuitry, said signal conveying at least one functional characteristic of a peripheral console, wherein said power supply connection point of said CPU conducts more than 20 percent of the power required for operation of the CPU at its maximum rated clock speed for no more than 30 minutes for any duration wherein said interconnection circuitry is continuously disconnected from a peripheral console.

34. An apparatus as in one of claims 1, 3, 4, 6, 28, 29, 30, 31, 32 and 33 wherein said interconnection circuitry conveys peripheral bus signals from multiple parallel paths as sequential data bits on a single signal path.

35. An apparatus as in one of claims 1, 3, 4, 6, 28, 29, 30, 31, 32 and 33 wherein said interconnection circuitry conveys electrical power, and signals comprising video output and peripheral bus information.

36. An apparatus as in one of claims 1, 3, 4, 6, 28, 29, 30, 31, 32 and 33 wherein said interconnection circuitry conveys electrical power, and signals comprising video output, video port, and peripheral bus information.

37. A personal computer system wherein the core computing power and environment for a computer user can be readily separated and transported from the remaining computer system components comprising:

(a) a detachable computing module including
an enclosure;
a CPU having a power supply connection point;
memory coupled to said CPU;
mass storage coupled to said CPU; and (b) a peripheral console comprising a power supply; and (c) interconnection circuitry coupled to said computing module and to said peripheral console for conveying electrical power and signals between said computing module and said peripheral console;

wherein said power supply connection point of said CPU is uncoupled from any electrical power source having sufficient energy to sustain execution of instructions by said CPU whenever said computing module is disconnected from said peripheral console.

38. The apparatus of claim 37 wherein said interconnection circuitry conveys computer bus signals from multiple parallel signal paths as sequential data bits on a single signal path.

39. A personal computer system wherein the core computing power and environment for a computer user can be readily separated and transported from the remaining computer system components comprising:

(a) a detachable computing module including
an enclosure,
a CPU,
memory coupled to said CPU,
mass storage coupled to said CPU, and
power supply circuitry having a stored energy capacity no greater than the energy required to power said CPU, memory, and mass storage for 30 minutes of operation at the maximum rated speed of the CPU;

(b) a peripheral console comprising a power supply; and (c) interconnection circuitry coupled to said computing module and to said peripheral console for conveying electrical power and signals between said computing module and said peripheral console.

40. The apparatus of claim 39 wherein said interconnection circuitry conveys computer bus signals from multiple parallel signal paths as sequential data bits on a single signal path.

41. A personal computer system wherein the core computing power and environment for a computer user can be readily separated and transported from the remaining computer system components comprising:

(a) a detachable computing module including
an enclosure;

a CPU having a power supply connection point;
memory coupled to said CPU; and
mass storage coupled to said CPU;

(b) a peripheral console comprising a power supply; and (c) interconnection circuitry coupled to said computing module and to said peripheral console for conveying electrical power and signals between said computing module and said peripheral console;

wherein said power supply connection point of said CPU conducts more than 20 percent of the power required for operation of the CPU at its maximum rated clock speed for not more than 30 minutes for any duration wherein said interconnection is continuously disconnected from a peripheral console.

42. The apparatus of claim 41 wherein said interconnection circuitry conveys computer bus signals from multiple parallel signal paths as sequential data bits on a single signal path.

* * * * *

UNITED STATES PATENT AND TRADEMARK OFFICE
CERTIFICATE OF CORRECTION

| | | |
|---|---|---|
| PATENT NO. | : 6,216,185 C1 | Page 1 of 3 |
| APPLICATION NO. | : 90/010816 | |
| DATED | : September 25, 2012 | |
| INVENTOR(S) | : William W. Y. Chu | |

It is certified that error appears in the above-identified patent and that said Letters Patent is hereby corrected as shown below:

In the Specifications
    Column 2, line 50, change "HCI" to --HIC--
    Column 4, line 54, change "bits control bits" to --bits and control bits--
    Column 5, line 18, change "hit" to --bit--
    Column 6, line 38, change "controller 1100" to --controller 1110--
    Column 7, line 10, change "from CPU" to --from the CPU--
    Column 7, line 15 and line 23, each occurrence of "signals" should be changed to --signal--
In the Claims
    Column 8, line 43 (Claim 43, line 1), change "A new detachable" to --A detachable--
    Column 8, line 67 (Claim 43, line 24), after "data" insert --, wherein said encoded Peripheral Component Interconnect bus transaction data comprises address and data bits of a Peripheral Component Interconnect bus transaction in serial form--
    Column 9, line 34 (Claim 45, line 29), after "transaction" insert --data, wherein said encoded serial bit stream of Peripheral Component Interconnect bus transaction data comprises address and data bits of a Peripheral Component Interconnect bus transaction--
    Column 9, line 35, cancel the text beginning with "46. The apparatus of" to and ending "and data bits." in column 9, line 36.
    Column 9, line 37 (Claim 47, line 1), change "47. The" to --46. The--
    Column 9, line 41 (Claim 48, line 1), change "48. The" to --47. The--
    Column 9, line 45 (Claim 49, line 1), change "49. A" to --48. A--
    Column 10, line 3 (Claim 49, line 25), after "tions" insert --, wherein said encoded Peripheral Component Interconnect bus transaction data comprises address and data bits of a Peripheral Component Interconnect bus transaction in serial form--
    Column 10, line 4 (Claim 50, line 1), change "50. The apparatus of claim 49" to --49. The apparatus of claim 48--
    Column 10, line 7 (Claim 51, line 1), change "51. A" to --50. A--
    Column 10, line 10 (Claim 51, line 4), change "component" to --components--
    Column 10, line 32 (Claim 51, line 25), after "transaction" insert --data, wherein said encoded serial bit stream of Peripheral Component Interconnect bus transaction data comprises address and Signed and Sealed this
Twenty-first Day of May, 2013

Teresa Stanek Rea
*Acting Director of the United States Patent and Trademark Office*

CERTIFICATE OF CORRECTION (continued)
U.S. Pat. No. 6,216,185 C1 data bits of a Peripheral Component Interconnect bus transaction.--

Column 10, line 33 (Claim 52, line 1), change "52. The apparatus of claim 51" to --51. The apparatus of claim 50--

Column 10, line 37 (Claim 53, line 1), change "53. The" to --52. The--

Column 10, line 46 (Claim 54, line 1), change "54. The apparatus of claim 53" to --53. The apparatus of claim 52--

Column 10, line 50, cancel the text beginning with "55. The apparatus of" to and ending "in serial form." in column 10, line 53.

Column 10, line 54, cancel the text beginning with "56. The apparatus of" to and ending "LVDS channel." in column 10, line 62.

Column 10, line 63 (Claim 57, line 1), change "57. The apparatus of claim 56" to --54. The apparatus of claim 43--

Column 11, line 1 (Claim 58, line 1), change "58. The apparatus of claim 46" to --55. The apparatus of claim 45--

Column 11, line 4 (Claim 58, line 4), after "tion" insert --data--

Column 11, line 6 (Claim 59, line 1), change "59. The apparatus of claim 58" to --56. The apparatus of claim 55--

Column 11, line 11 (Claim 59, line 6), after "transaction" insert --data--

Column 11, line 12 (Claim 60, line 1), change "60. The apparatus of claim 59" to --57. The apparatus of claim 56--

Column 11, line 14 (Claim 61, line 1), change "61. The apparatus of claim 60" to --58. The apparatus of claim 57--

Column 11, line 19 (Claim 61, line 7), after "transaction" insert--data--

Column 11, line 21 (Claim 62, line 1), change "62. The apparatus of claim 59" to --59. The apparatus of claim 56--

Column 11, line 24 (Claim 63, line 1), change "63. The apparatus of claim 49" to --60. The apparatus of claim 48--

Column 11, line 28 (Claim 64, line 1), change "64. The apparatus of claim 49" to --61. The apparatus of claim 48--

Column 11, line 40 (Claim 64, line 13), after "transaction" insert --data--

Column 11, line 41 (Claim 65, line 1), change "65. The apparatus of claim 64" to --62. The apparatus of claim 61--

Column 11, line 44 (Claim 65, line 4), after "transaction" insert --data--

Column 11, line 45 (Claim 66, line 1), change "66. The apparatus of claim 64" to --63. The apparatus of claim 61--

Column 12, line 1 (Claim 67, line 1), change "67. The apparatus of claim 64" to --64. The apparatus of claim 61--

Column 12, line 4 (Claim 68, line 1), change "68. The apparatus of claim 64" to --65. The apparatus of claim 61--

Column 12, line 7 (Claim 69, line 1), change "69. The apparatus of claim 64" to --66. The apparatus of claim 61--

Column 12, line 10 (Claim 70, line 1), change "70. The apparatus of claim 51" to --67. The apparatus of claim 50--

Column 12, line 15 (Claim 70, line 6) and line 21 (Claim 70, line 12), after each occurrence of "transaction" insert --data--

CERTIFICATE OF CORRECTION (continued)
U.S. Pat. No. 6,216,185 C1

Column 12, line 22 (Claim 71, line 1), change "71. The apparatus of claim 70" to --68. The apparatus of claim 67--

Column 12, line 27 (Claim 72, line 1), change "72. The apparatus of claim 70" to --69. The apparatus of claim 67--

Column 12, line 31 (Claim 73, line 1), change "73. The apparatus of claim 70" to --70. The apparatus of claim 67--

Column 12, line 35 (Claim 74, line 1), change "74. The apparatus of claim 73" to --71. The apparatus of claim 70--

Column 12, line 38 (Claim 75, line 1), change "75. The apparatus of claim 74" to --72. The apparatus of claim 71--

Column 12, line 41 (Claim 76, line 1), change "76. The apparatus of claim 70" to --73. The apparatus of claim 67--

Column 12, line 44 (Claim 77, line 1), change "77. The apparatus of claim 70" to --74. The apparatus of claim 67--

US006216185C1

(12) EX PARTE REEXAMINATION CERTIFICATE (9316th)
United States Patent
Chu

(10) Number: US 6,216,185 C1
(45) Certificate Issued: Sep. 25, 2012

(54) PERSONAL COMPUTER PERIPHERAL CONSOLE WITH ATTACHED COMPUTER MODULE

(75) Inventor: William W. Y. Chu, Los Altos, CA (US)

(73) Assignee: Acqis LLC, McKinney, TX (US)

Reexamination Request:
No. 90/010,816, Jan. 8, 2010

Reexamination Certificate for:
Patent No.: 6,216,185
Issued: Apr. 10, 2001
Appl. No.: 09/149,548
Filed: Sep. 8, 1998

Related U.S. Application Data

(60) Provisional application No. 60/092,706, filed on Jul. 14, 1998, and provisional application No. 60/083,886, filed on May 1, 1998.

(51) Int. Cl.
*G06F 1/16* (2006.01)

(52) U.S. Cl. ............... 710/303; 710/72; 713/300
(58) Field of Classification Search .............. None
See application file for complete search history.

(56) References Cited

To view the complete listing of prior art documents cited during the proceeding for Reexamination Control Number 90/010,816, please refer to the USPTO's public Patent Application Information Retrieval (PAIR) system under the Display References tab.

*Primary Examiner* — Majid Banankhah

(57) ABSTRACT

A personal computer system comprises physically separate units and an interconnection between the units. An attached computing module (ACM) contains the core computing power and environment for a computer user. A peripheral console (PCON), contains the power supply and primary input and output devices for the computer system. To form an operational computer system, an ACM is coupled with a PCON. The plug-in module design of the ACM, and the concentration of high-value components therein (both in terms of high-value hardware and high-value files), makes it easy for a user to transport the high-value core between multiple PCON's, each of which can enjoy a relatively low cost. The concentration of a user's core computing environment in a small, portable package also makes it possible for large organizations to perform moves, adds, and changes to personal computer systems with greater efficiency.

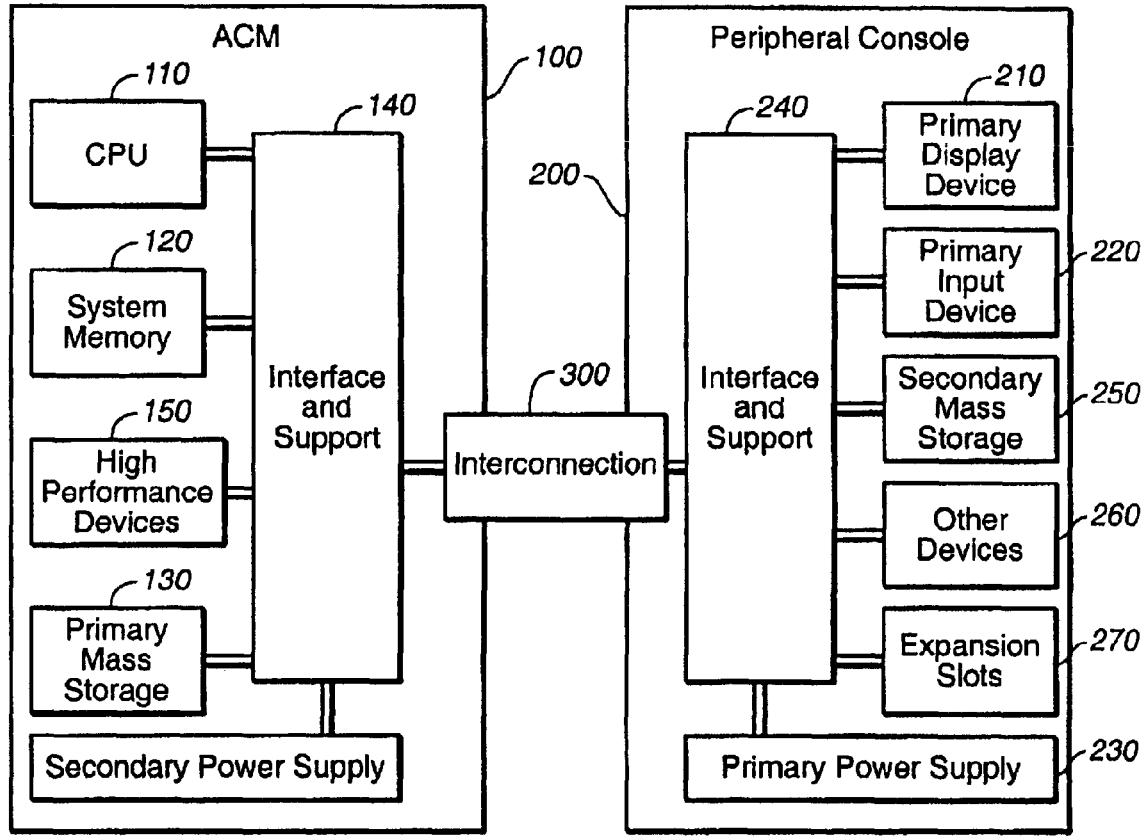

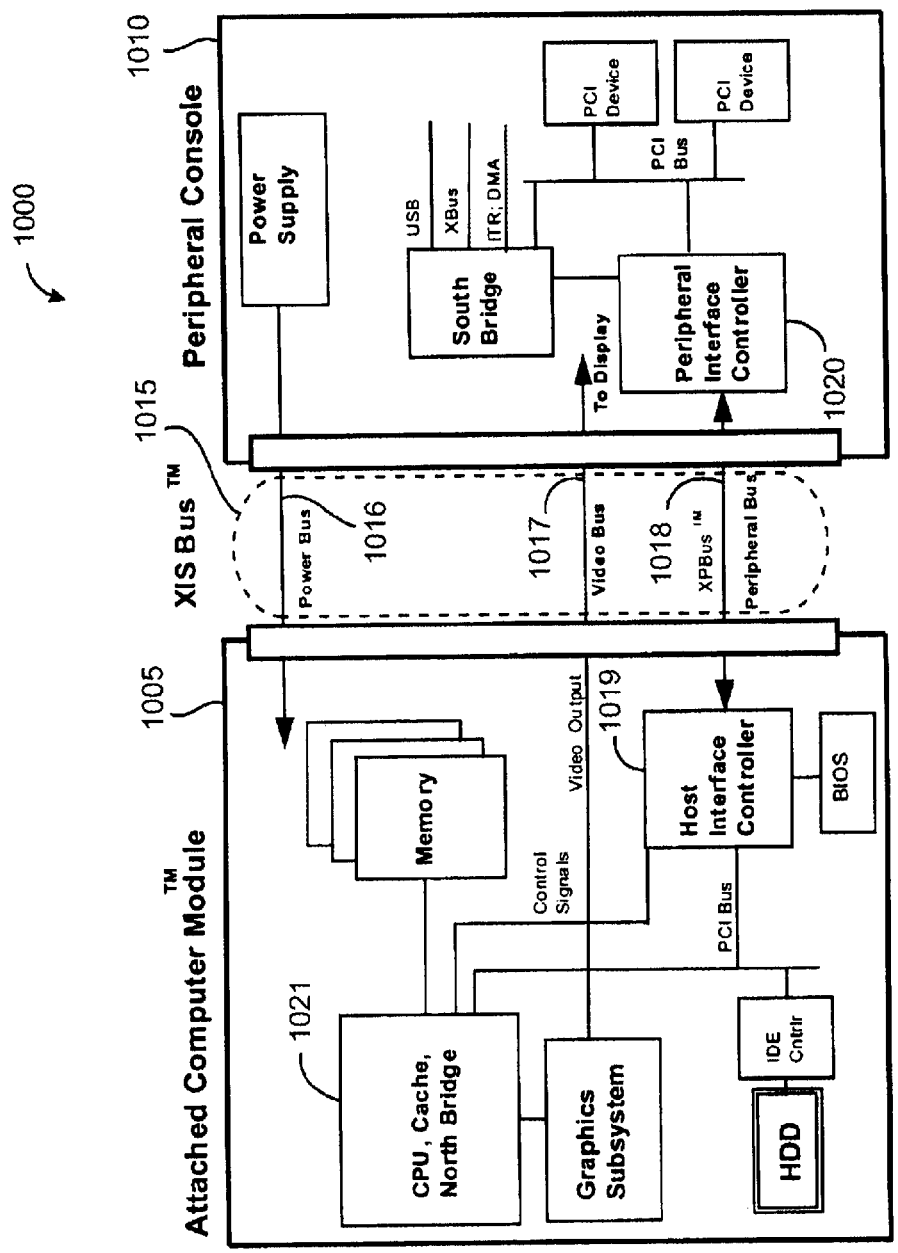
FIG. 10
NEW

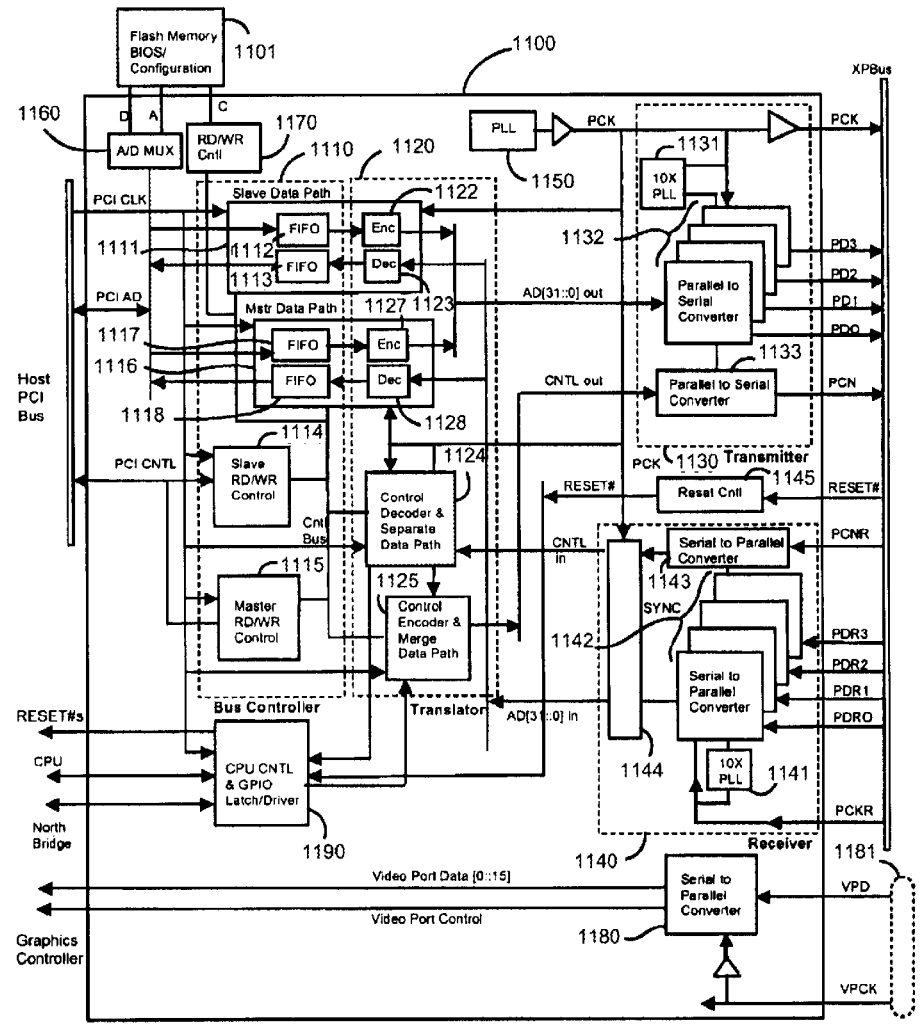
FIG. 11
NEW

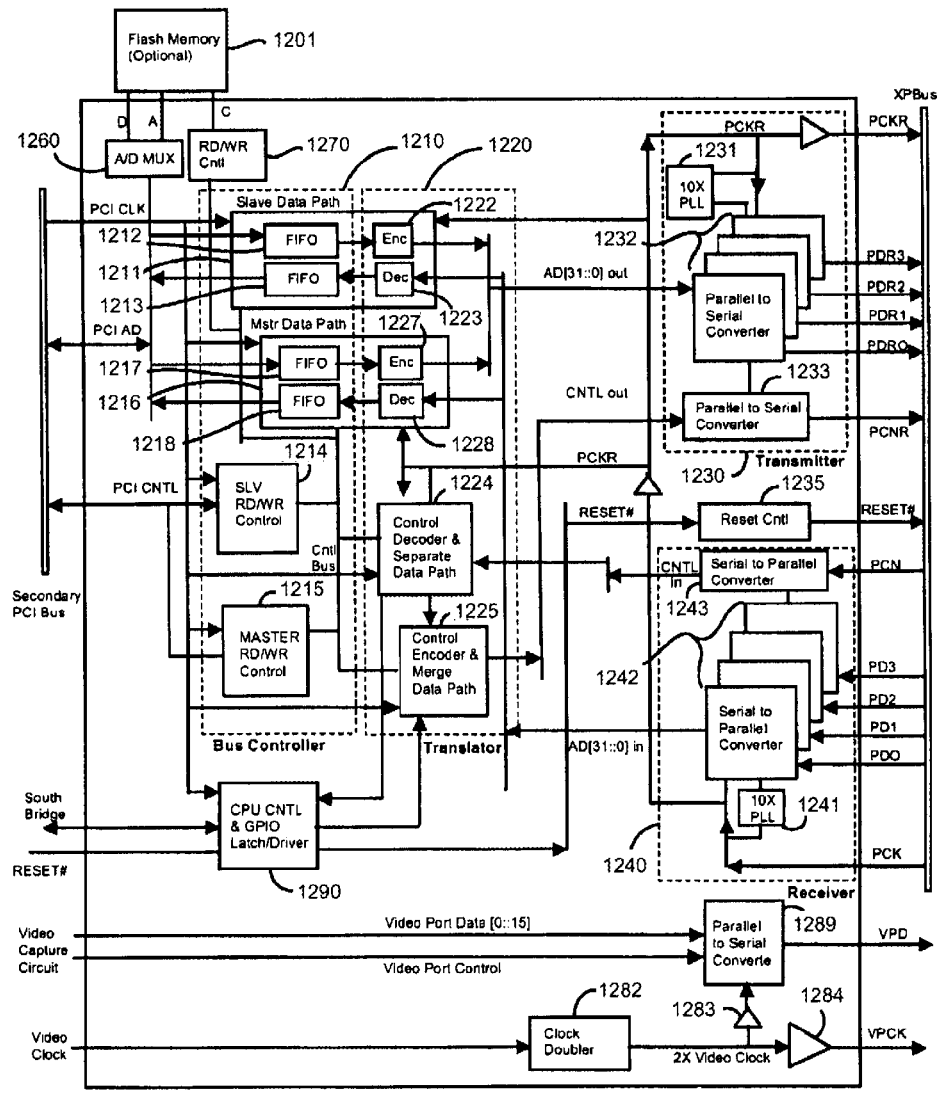
FIG. 12
NEW

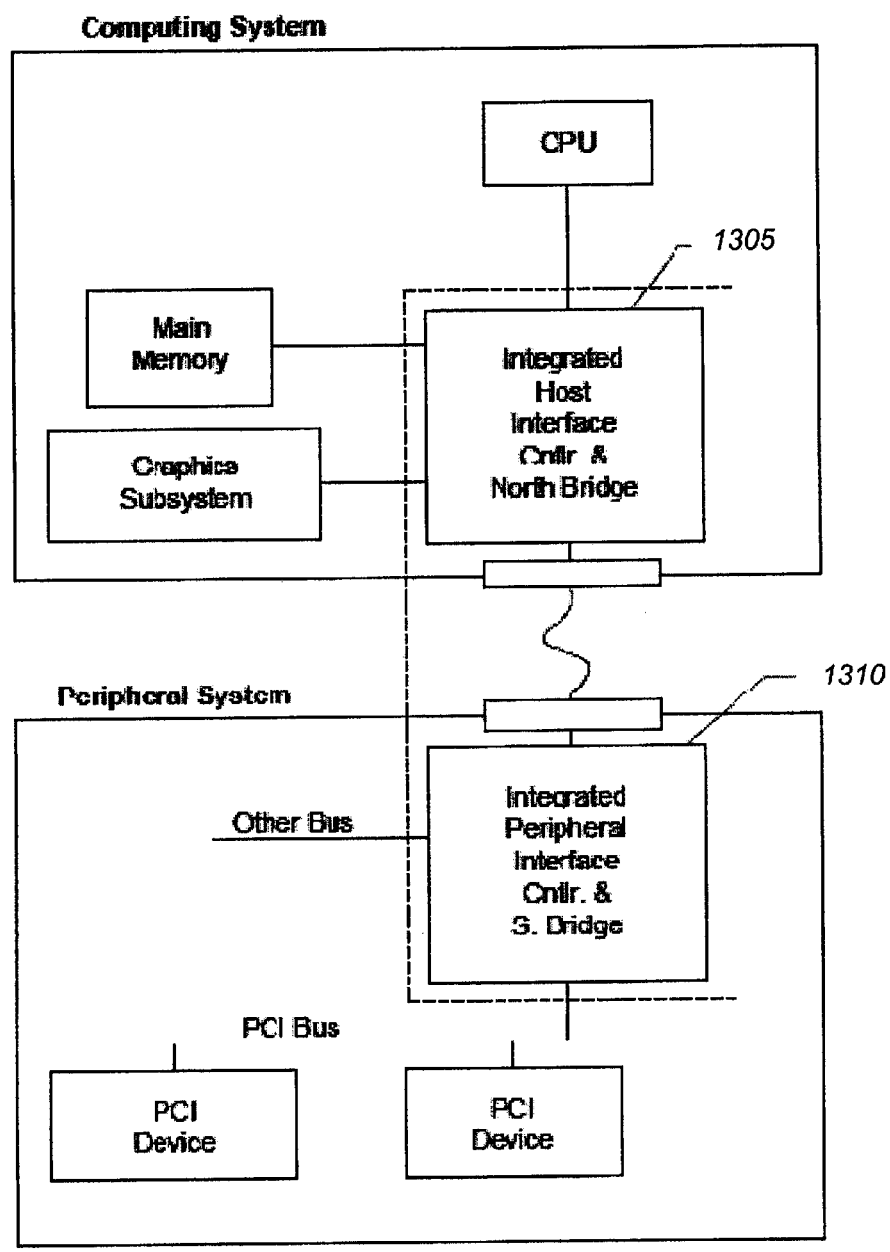
FIG. 13
NEW

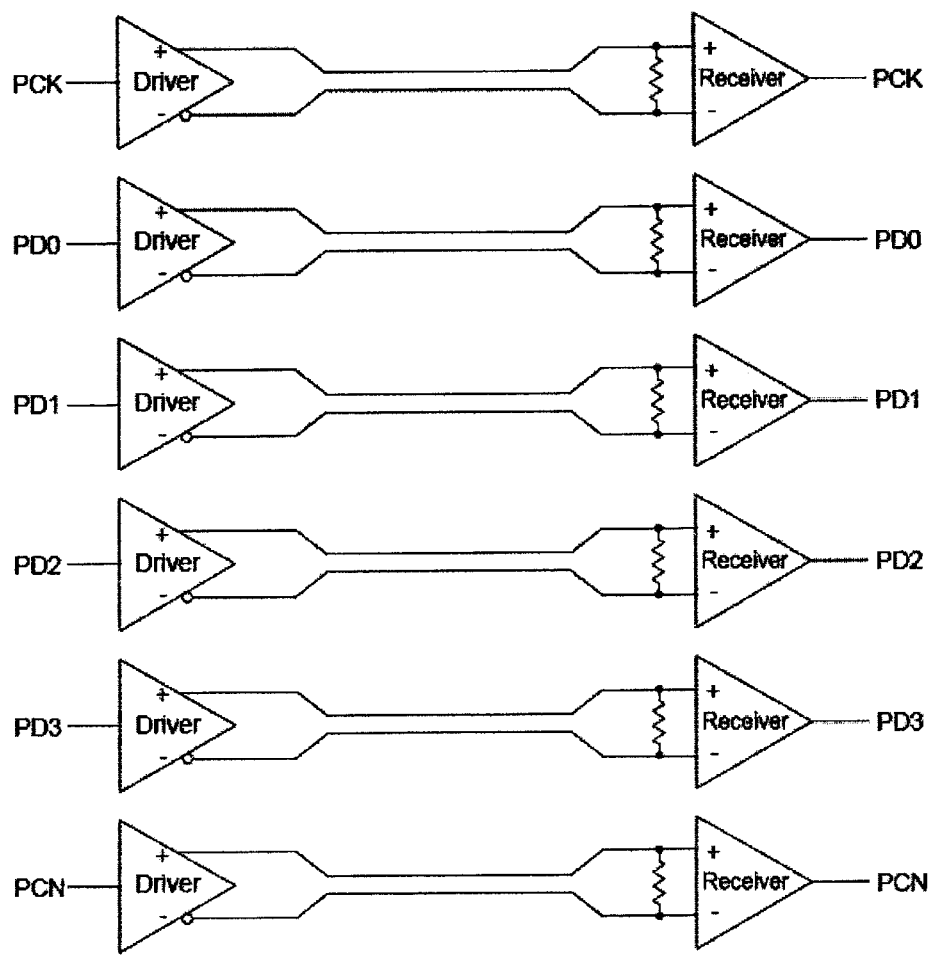
FIG. 14
NEW

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, line 40:

*FIG. 10 is a block diagram of one embodiment of a computer system using the interface of the present invention.*

*FIG. 11 is a detailed block diagram of one embodiment of the host interface controller of the present invention.*

*FIG. 12 is a detailed block diagram of one embodiment of the PIC of the present invention.*

*FIG. 13 is a partial block diagram of a computer system in which the north and south bridges are integrated with the host and peripheral interface controllers, respectively.*

*FIG. 14 is a schematic diagram of the signal lines PCK, PD0 to PD3, and PCN.*

Column 17, line 30:

*One disadvantage of an interface having a relatively large number of conductive lines and pins is that it costs more than one that uses a fewer number of conductive lines and pins. Additionally, an interface having a large number of conductive lines is bulkier and more cumbersome to handle. Finally, a relatively large number of signal channels in the interface renders the option of using differential voltage signals less viable because a differential voltage signal method would require duplicating a large number of signal lines. It is desirable to use a low voltage differential signal (LVDS) channel in the computer system of the present invention because an LVDS channel is more cable friendly, faster, consumes less power, and generates less noise, including electromagnetic interferences (EMI), than a PCI channel. The term LVDS is herein used to generically refer to low voltage differential signals and is not intended to be limited to any particular type of LVDS technology.*

*The present invention overcomes the aforementioned disadvantages of the prior art by interfacing two PCI or PCI-like buses using a non-PCI or non-PCI-like channel. In the present invention, PCI control signals are encoded into control bits and the control bits, rather than the control signals that they represent, are transmitted on the interface channel. At the receiving end, the control bits representing control signals are decoded back into PCI control signals prior to being transmitted to the intended PCI bus.*

*The fact that control bits rather than control signals are transmitted on the interface channel allows using a smaller number of signal channels and a correspondingly small number of conductive lines in the interface channel than would otherwise be possible. This is because the control bits can be more easily multiplexed at one end of the interface channel and recovered at the other end than control signals. This relatively small number of signal channels used in the interface channel allows using LVDS channels for the interface. As mentioned above, an LVDS channel is more cable friendly, faster, consumes less power, and generates less noise than a PCI bus channel, which is used in the prior art to interface two PCI buses. Therefore, the present invention advantageously uses an LVDS channel for the hereto unused purpose of interfacing PCI or PCI-like buses. The relatively smaller number of signal channels in the interface also allows using connectors having smaller pins counts. As mentioned above an interface having a smaller number of signal channels and, therefore, a smaller number of conductive lines is less bulky and less expensive than one having a larger number of signal channels. Similarly, connectors having a smaller number of pins are also less expensive and less bulky than connectors having a larger number of pins.*

*In one embodiment, the present invention encompasses an apparatus for bridging a first computer interface bus and a second computer interface bus, in a microprocessor based computer system where each of the first and second computer interface buses have a number of parallel multiplexed address/data bus lines and operate at a clock speed in a predetermined clock speed range having a minimum clock speed and a maximum clock speed. The apparatus comprises an interface channel having a clock channel and a plurality of bit channels for transmitting bits; a first interface controller coupled to the first computer interface bus and to the interface channel to encode first control signals from the first computer interface bus into first control bits to be transmitted on the interface channel and to decode second control bits received from the interface channel into second control signals to be transmitted to the first computer interface bus; and a second interface controller coupled to the interface channel and the second computer interface bus to decode the first control bits from the interface channel into third control signals to be transmitted on the second computer interface bus and to encode fourth control signals from the second computer interface bus into the second control bits to be transmitted on the interface channel.*

*In one embodiment, the first and second interface controllers comprise a host interface controller (HIC) and a peripheral interface controller (PIC), respectively, the first and second computer interface buses comprise a primary PCI and a secondary PCI bus, respectively, and the interface channel comprises an LVDS channel.*

*In a preferred embodiment, the interface channel has a plurality of serial bit channels numbering fewer than the number of parallel bus lines in each of the PCI buses and operates at a clock speed higher than the clock speed at which any of the bus lines operates. More specifically, the interface channel includes two sets of unidirectional serial bit channels which transmit data in opposite directions such that one set of bit channels transmits serial bits from the HCI to the PIC while the other set transmits serial bits from the PIC to the HIC. For each cycle of the PCI clock, each bit channel of the interface channel transmits a packet of serial bits.*

*The HIC and PIC each include a bus controller to interface with the first and second computer interface buses, respectively, and to manage transactions that occur therewith. The HIC and PIC also include a translator coupled to the bus controller to encode control signals from the first and second computer interface buses, respectively, into control bits and to decode control bits from the interface channel into control signals. Additionally, the HIC and PIC each include a transmitter and a receiver coupled to the translator. The transmitter converts parallel bits into serial bits and transmits the serial bits to the interface channel. The receiver receives serial bits from the interface channel and converts them into parallel bits.*

FIG. 10 is a block diagram of one embodiment of a computer system 1000 using the interface of the present invention. Computer system 1000 includes an attached computer module (ACM) 1005 and a peripheral console 1010, which are described in greater detail in the application of William W. Y. Chu for "Personal Computer Peripheral Console With Attached Computer Module" filed concurrently with the present application on Sep. 8, 1998 and incorporated herein by reference. The ACM 1005 and the peripheral console 1010 are interfaced through an exchange interface system (XIS) bus 1015. The XIS bus 1015 includes power bus 1016, video bus 1017 and peripheral bus (XPBus) 1018, which is also herein referred to as an interface channel. The power bus 1016 transmits power between ACM 1005 and peripheral console 1010. In a preferred embodiment power bus 1016 transmits power at voltage levels of 3.3 volts, 5 volts and 12 volts. Video bus 1017 transmits video signals between the ACM 1005 and the peripheral console 1010. In a preferred embodiment, the video bus 1017 transmits analog Red Green Blue (RGB) video signals for color monitors, digital video signals (such as Video Electronics Standards Association (VESA) Plug and Display's Transition Minimized Differential Signaling (TMDS) signals for flat panel displays), and television (TV) and/or super video (S-video) signals. The XPBus 1018 is coupled to host interface controller (HIC) 1019 and to peripheral interface controller (PIC) 1020, which is also sometimes referred to as a bay interface controller.

In the embodiment shown in FIG. 10, HIC 1019 is coupled to an integrated unit 1021 that includes a CPU, a cache and a north bridge.

FIG. 11 is a detailed block diagram of one embodiment of the HIC of the present invention. As shown in FIG. 11, HIC 1100 comprises bus controller 1110, translator 1120, transmitter 1130, receiver 1140, a PLL 1150, an address/data multiplexer (A/D MUX) 1160, a read/write controller (RD/WR Cntl) 1170, a video serial to parallel converter 1180 and a CPU control & general purpose input/output latch/driver (CPU CNTL & GPIO latch/driver) 1190.

HIC 1100 is coupled to an optional flash memory BIOS configuration unit 1101. Flash memory unit 1101 stores basic input output system (BIOS) and PCI configuration information and supplies the BIOS and PCI configuration information to A/D MUX 1160 and RD/WR Control 1170, which control the programming, read, and write of flash memory unit 1101.

Bus controller 1110 is coupled to the host PCI bus, which is also referred to herein as the primary PCI bus, and manages PCI bus transactions on the host PCI bus. Bus controller 1110 includes a slave (target) unit 1111 and a master unit 1116. Both slave unit 1111 and master unit 1116 each include two first in first out (FIFO) buffers, which are preferably asynchronous with respect to each other since the input and output of the two FIFOs in the master unit 1116 as well as the two FIFOs in the slave unit 1111 are clocked by different clocks, namely the PCI clock and the PCK. Additionally, slave unit 1111 includes encoder 1122 and decoder 1123, while master unit 1116 includes encoder 1127 and decoder 1128. The FIFOs 1112, 1113, 1117 and 1118 manage data transfers between the host PCI bus and the XPBus, which in the embodiment shown in FIG. 11 operate at 33 MHz and 66 MHz, respectively. PCI address/data (AD) from the host PCI bus is entered into FIFOs 1112 and 1117 before they are encoded by encoders 1122 and 1127. Encoders 1122 and 1127 format the PCI address/data bits to a form more suitable for parallel to serial conversion prior to transmittal on the XPBus. Similarly, address and data information from the receivers is decoded by decoders 1123 and 1128 to a form more suitable for transmission on the host PCI bus. Thereafter the decoded data and address information is passed through FIFOs 1113 and 1118 prior to being transferred to the host PCI bus. FIFOs 1112, 1113, 1117 and 1118 allow bus controller 1110 to handle posted and delayed PCI transactions and to provide deep buffering to store PCI transactions.

Bus controller 1110 also comprises slave read/write control (RD/WR Cntl) 1114 and master read/write control (RD/WR Cntl) 1115. RD/WR controls 1114 and 1115 are involved in the transfer of PCI control signals between bus controller 1110 and the host PCI bus.

Bus controller 1110 is coupled to translator 1120. Translator 1120 comprises encoders 1122 and 1127, decoders 1123 and 1128, control decoder & separate data path unit 1124 and control encoder & merge data path unit 1125. As discussed above encoders 1122 and 1127 are part of slave data unit 1111 and master data unit 1116, respectively, receive PCI address and data information from FIFOs 1112 and 1117, respectively, and encode the PCI address and data information into a form more suitable for parallel to serial conversion prior to transmittal on the XPBus. Similarly, decoders 1123 and 1128 are part of slave data unit 1111 and master data unit 1116, respectively, and format address and data information from receiver 1140 into a form more suitable for transmission on the host PCI bus. Control encoder & merge data path unit 1125 receives PCI control signals from the slave RD/WR control 1114 and master RD/WR control 1115. Additionally, control encoder & merge data path unit 1125 receives control signals from CPU CNTL & GPIO latch/driver 1190, which is coupled to the CPU and north bridge (not shown in FIG. 11). Control encoder & merge data path unit 1125 encodes PCI control signals as well as CPU control signals and north bridge signals into control bits, merges these encoded control bits and transmits the merged control bits to transmitter 1130, which then transmits the control bits on the data lines PD0 to PD3 and control line PCN of the XPBus. Examples of control signals include PCI control signals and CPU control signals. A specific example of a control signal is FRAME# used in PCI buses. A control bit, on the other hand is a data bit that represents a control signal. Control decoder & separate data path unit 1124 receives control bits from receiver 1140 which receives control bits on data lines PDR0 to PDR3 and control line PCNR of the XPBus. Control decoder & separate data path unit 1124 separates the control bits it receives from receiver 1140 into PCI control signals, CPU control signals and north bridge signals, and decodes the control bits into PCI control signals, CPU control signals, and north bridge signals all of which meet the relevant timing constraints.

Transmitter 1130 receives multiplexed parallel address/data (A/D) bits control bits from translator 1120 on the AD[31::0] out and the CNTL out lines, respectively. Transmitter 1130 also receives a clock signal from PLL 1150. PLL 1150 takes a reference input clock and generates PCK that drives the XPBus. PCK is asynchronous with the PCI clock signal and operates at 66 MHz, twice the speed of the PCI clock of 33 MHz. The higher speed is intended to accommodate at least some possible increases in the operating speed of future PCI buses. As a result of the higher speed, the XPBus may be used to interface two PCI or PCI-like buses operating at 66 MHz rather than 33 MHz or having 64 rather than 32 multiplexed address/data lines.

The multiplexed parallel A/D bits and some control bits input to transmitter 1130 are serialized by parallel to serial converters 1132 of transmitter 1130 into 10 bit packets. These bit packets are then output on data lines PD0 to PD3 of the XPBus. Other control bits are serialized by parallel to serial converter 1133 into 10 bit packets and send out on control line PCN of the XPBus.

A 10× multiplier 1131 receives PCK, multiplies it by a factor of 10 and feeds a clock signal 10 times greater than PCK into the parallel to serial converters 1132 and 1133. The parallel to serial converters 1132 and 1133 perform bit shifting at 10 times the PCK rate to serialize the parallel bits into 10 bit packets. As the parallel to serial converters 1132 and 1133 shift bits at 10 times the PCK rate, the bit rate for the serial bits output by the parallel to serial converters is 10 times higher than PCK rate, i.e., 660 MHz. However, the rate at which data packets are transmitted on the XPBus is the same as the PCK rate, i.e., 66 MHz. As the PCI buses operate at a clock and bit rate of 33 MHz, the XPBus has a clock rate that is twice as large and a bit rate per hit line (channel) that is 20 times as large as that of the PCI buses which it interfaces.

Receiver 1140 receives serial bit packets on data lines PDR0 to PDR3 and control line PCNR. Receiver 1140 also receives PCKR on the XPBus as well as the clock signal PCK from PLL 1150. The synchronizer (SYNC) 1144 of receiver 1140 synchronizes the clock signal PCKR to the locally generated clock signal, PCK, in order to capture the bits received from the XPBus into PCK clock timing.

Serial to parallel converters 1142 convert the serial bit packets received on lines PDR0 to PDR3 into parallel address/data and control bits that are sent to decoders 1123 and 1128 and control decoder and separate data path unit 1124, respectively. Serial to parallel converter 1143 receives control bit packets from control line PCNR, converts them to parallel control bits and sends the parallel control bits to control decoder & separate data path 1124.

A 10× multiplier 1141 receives PCKR, multiplies it by a factor of 10 and feeds a clock signal 10 times greater than PCKR into the serial to parallel converters 1142 and 1143. Because the bits on PDR0 to PDR3 and PCNR are transmitted at a bit rate of 10 times the PCKR rate, the serial to parallel converters 1142 and 1143 perform bit shifting at 10 times the PCKR rate to convert the 10 bit packets into parallel bits. It is to be noted that the rate at which bit packets are transmitted on the XPBus is the same as the PCKR rate, i.e., 66 MHz. The parallel data and control bits are thereafter sent to decoders 1123 and 1128 by way of the AD[31::0] in line and to control decoder & separate data path unit 1124 by way of CNTL in lines, respectively.

Reset control unit 1145 of HIC 1100 receives the signal RESET#, which is an independent system reset signal, on the reset line RESET#. Reset control unit 1145 then transmits the reset signal to the CPU CNTL & GPIO latch/driver unit 1190.

As may be noted from the above, the 32 line host and secondary PCI buses are interfaced by 10 XPBus lines (PD0, PD1, PD2, PD3, PCN, PDR0, PDR1, PDR2, PDR3, PCNR). Therefore, the interface channel, XPBus, of the present invention uses fewer lines than are contained in either of the buses which it interfaces, namely the PCI buses. XPBus is able to interface such PCI buses without backup delays because the XPBus operates at a clock rate and a per line (channel) bit rate that are higher than those of the PCI buses.

In addition to receiving a reset signal, the CPU CNTL & GPIO latch/driver 1190 is responsible for latching input signals from the CPU and north bridge and sending the signals to the translator. It also takes decoded signals from the control decoder & separate data path unit 1124 and drives the appropriate signals for the CPU and north bridge.

In the embodiment shown in FIG. 11, video serial to parallel converter 1180 is included in HIC 1100. In another embodiment, video serial to parallel converter 1180 may be a separate unit from the HIC 1100. Video serial to parallel converter 1180 receives serial video data on line VPD and a video clock signal VPCK from line VPCK of video bus 1181. It then converts the serial video data into 16 bit parallel video port data and the appropriate video port control signals, which it transmits to the graphics controller (not shown in FIG. 11) on the video port data [0::15] and video port control lines, respectively.

HIC 1100 handles the PCI bus control signals and control bits from the XPBus representing PCI control signals in the following ways:

1. HIC 1100 buffers clocked control signals from the host PCI bus, encodes them into control bits and sends the encoded control bits to the XPBus;

2. HIC 1100 manages the signal locally; and

3. HIC 1100 receives control bits from XPBus, translates the control bits into PCI control signals and sends the PCI control signals to the host PCI bus.

FIG. 12 is a detailed block diagram of one embodiment of the PIC of the present invention. PIC 1200 is nearly identical to HIC 1100 in its function, except that HIC 1100 interfaces the host PCI bus to the XPBus while PIC 1200 interfaces the secondary PCI bus to the XPBus. Similarly, the components in PIC 1200 serve the same function as their corresponding components in HIC 1100. Reference numbers for components in PIC 1200 have been selected such that a component in PIC 1200 and its corresponding component in HIC 1100 have reference numbers that have the same two least significant digits. Thus for example, the bus controller in PIC 1200 is referenced as bus controller 1210 while the bus controller in HIC 1100 is referenced as bus controller 1100. As many of the elements in PIC 1200 serve the same functions as those served by their corresponding elements in HIC 1100 and as the functions of the corresponding elements in HIC 1100 have been described in detail above, the function of elements of PIC 1200 having corresponding elements in HIC 1100 will not be further described herein. Reference may be made to the above description of FIG. 11 for an understanding of the functions of the elements of PIC 1200 having corresponding elements in HIC 1100.

As suggested above, there are also differences between HIC 1100 and PIC 1200. Some of the differences between HIC 1100 and PIC 1200 include the following. First, receiver 1240 in PIC 1200, unlike receiver 1140 in HIC 1100, does not contain a synchronization unit. As mentioned above, the synchronization unit in HIC 1100 synchronizes the PCKR clock to the PCK clock locally generated by PLL 1150. PIC 1200 does not locally generate a PCK clock and therefore, it does not have a locally generated PCK clock with which to synchronize the PCK clock signal that it receives from HIC 1100. Another difference between PIC 1200 and HIC 1100 is the fact that PIC 1200 contains a video parallel to serial converter 1289 whereas HIC 1100 contains a video serial to parallel converter 1180. Video parallel to serial converter 1289 receives 16 bit parallel video capture data and video control signals on the Video Port Data [0::15] and Video Port Control lines, respectively, from the video capture circuit (not shown in FIG. 12) and converts them to a serial video data stream that is transmitted on the VPD line to the HIC. The video capture circuit may be any type of video capture circuit that outputs a 16 bit parallel video capture data and video control signals. Another difference lies in the fact that PIC 1200, unlike HIC 1100, contains a clock doubler 1282 to double the video clock rate of the video clock signal that it receives. The doubled video clock rate is fed into video parallel to serial converter 1289 through buffer 1283 and is sent to serial to parallel converter 1180 through buffer 1284. Additionally, reset control unit 1235 in PIC 1200 receives a reset signal from CPU CNTL & GPIO latch/driver unit 1290 and transmits the reset signal on the RESET# line to the HIC 1100 whereas reset control unit 1145 of HIC 1100 receives the reset signal and forwards it to its CPU CNTL & GPIO latch/driver unit 1190 because, in the above embodiment, the reset signals RESET# is unidirectionally sent from the PIC 1200 to the HIC 1100.

Like HIC 1100, PIC 1200 handles the PCI bus control signals and control bits from the XPBus representing PCI control signals in the following ways:

1. PIC 1200 buffers clocked control signals from the secondary PCI bus, encodes them and sends the encoded control bits to the XPBus;
2. PIC 1200 manages the signals locally; and
3. PIC 1200 receives control bits from XPBus, translates them into PCI control signals and sends the PCI control signals to the secondary PCI bus.

PIC 1200 also supports a reference arbiter on the secondary PCI Bus to manage the PCI signals REQ# and GNT#.

In yet another embodiment, such as that shown in FIG. 13, the HIC and PIC are integrated with the north and south bridges, respectively, such that integrated HIC and north bridge unit 1305 includes an HIC and a north bridge, while integrated PIC and south bridge unit 1310 includes a PIC and a south bridge.

FIG. 14 is a schematic diagram of lines PCK, PD0 to PD3, and PCN. These lines are unidirectional LVDS lines for transmitting clock signals and bits from the HIC to the PIC. The bits on the PD0 to PD3 and the PCN lines are sent synchronously within every clock cycle of the PCK. Another set of lines, namely PCKR, PDR0 to PDR3, and PCNR, are used to transmit clock signals and bits from the PIC to HIC. The lines used for transmitting information from the PIC to the HIC have the same structure as those shown in FIG. 14, except that they transmit data in a direction opposite to that in which the lines shown in FIG. 14 transmit data. In other words they transmit information from the PIC to the HIC. The bits on the PDR0 to PDR3 and the PCNR lines are sent synchronously within every clock cycle of the PCKR. Some of the examples of control information that may be sent in the reverse direction, i.e., on PCNR line, include a request to switch data bus direction because of a pending operation (such as read data available), a control signal change in the target requiring communication in the reverse direction, target busy, and transmission error detected.

The XPBus which includes lines PCK, PD0, to PD3, PCN, PCKR, PDR0 to PDR3, and PCNR, has two sets of unidirectional lines transmitting clock signals and bits in opposite directions. The first set of unidirectional lines includes PCK, PD0 to PD3, and PCN. The second set of unidirectional lines includes PCKR, PDR0 to PDR3, and PCNR. Each of these unidirectional set of lines is a point-to-point bus with a fixed transmitter and receiver, or in other words a fixed master and slave bus. For the first set of unidirectional lines, the HIC is a fixed transmitter/master whereas the PIC is a fixed receiver/slave. For the second set of unidirectional lines, the PIC is a fixed transmitter/master whereas the HIC is a fixed receiver/slave. The LVDS lines of XPBus, a cable friendly and remote system I/O bus, transmit fixed length data packets within a clock cycle.

The XPBus lines, PD0 to PD3, PCN, PDR0 to PDR3 and PCNR, and the video data and clock lines, VPD and VPCK, are not limited to being LVDS lines, as they may be other forms of bit based lines. For example, in another embodiment, the XPBus lines may be IEEE 1394 lines.

It is to be noted that although each of the lines PCK, PD0 to PD3, PCN, PCKR, PDR0 to PDR3, PCNR, VPCK, and VPD is referred to as a line, in the singular rather than plural, each such line may contain more than one physical line. For example, in the embodiment shown in FIG. 14, each of lines PCK, PD0 to PD3 and PCN includes two physical lines between each driver and its corresponding receiver. The term line, when not directly preceded by the terms physical or conductive, is herein used interchangeably with a signal or bit channel which may consist of one or more physical lines for transmitting a signal. In the case of non-differential signal lines, generally only one physical line is used to transmit one signal. However, in the case of differential signal lines, a pair of physical lines is used to transmit one signal. For example, a bit line or bit channel in an LVDS or IEEE 1394 interface consists of a pair of physical lines which together transmit a signal.

A bit based line (i.e., a bit line) is a line for transmitting serial bits. Bit based lines typically transmit bit packets and use a serial data packet protocol. Examples of bit lines include an LVDS line, an IEEE 1394 line, and a Universal Serial Bus (USB) line.

THE DRAWING FIGURES HAVE BEEN CHANGED AS FOLLOWS:

FIG. Nos. 10, 11, 12, 13, and 14 are added.

AS A RESULT OF REEXAMINATION, IT HAS BEEN DETERMINED THAT:

Claims 1-42 are cancelled.

New claims 43-77 are added and determined to be patentable.

*43. A new detachable computing module for attachment to a peripheral console for forming a fully operational personal computer system comprising:* an enclosure;

a CPU having a power supply connection point;

memory coupled to said CPU;

mass storage coupled to said CPU; and interconnection circuitry coupled to said CPU, said interconnection circuitry connectable to a peripheral console, said interconnection circuitry configured to convey a low-voltage differential signaling (LVDS) bit stream;

wherein said power supply connection point of said CPU is uncoupled from any electrical power source having sufficient energy to sustain execution of instructions by said CPU whenever said interconnection circuitry is disconnected from a peripheral console, wherein said interconnection circuitry comprises a LVDS channel comprising two sets of unidirectional, multiple serial bit channels to transmit data in opposite directions, wherein said LVDS channel is configured to convey encoded Peripheral Component Interconnect bus transaction data.

44. The apparatus of claim 43 wherein said encoded Peripheral Component Interconnect bus transaction data comprises 10 bit packets.

45. A detachable computing module for attachment to a peripheral console for forming a fully operational personal computer system comprising:
   an enclosure;
   a CPU;
   memory coupled to said CPU;
   mass storage coupled to said CPU;
   a communication channel coupled to said CPU and configured to convey a low-voltage differential signaling (LVDS) bit stream;
   interconnection circuitry coupled to said CPU, said interconnection circuitry connectable to a peripheral console; and
   power supply circuitry having a stored energy capacity no greater than the energy required to power said CPU, memory, and mass storage for 30 minutes of operation at the maximum rated speed of the CPU,
   wherein said communication channel comprises a first unidirectional, serial bit channel and a second unidirectional, serial bit channel, and said first unidirectional, serial bit channel and said second unidirectional, serial bit channel are configured to transmit data in opposite directions,
   wherein said communication channel comprises multiple pairs of unidirectional, serial bit channels to transmit data in opposite directions,
   wherein said communication channel is configured to convey an encoded serial bit stream of Peripheral Component Interconnect bus transaction.

46. The apparatus of claim 45 wherein said encoded serial bit stream comprises encoded address and data bits.

47. The apparatus of claim 45 wherein said interconnection circuitry is coupled to said communication channel to encode Peripheral Component Interconnect bus transaction data as said encoded serial bit stream.

48. The apparatus of claim 45 wherein said interconnection circuitry comprises said communication channel to convey said encoded serial bit stream between said computing module and said peripheral console.

49. A personal computer system wherein the core computing power and environment for a computer user can be readily separated and transported from the remaining computer system components comprising:
   (a) a detachable computing module including
      an enclosure;
      a CPU having a power supply connection point;
      memory coupled to said CPU;
      mass storage coupled to said CPU; and
   (b) a peripheral console comprising a power supply; and
   (c) interconnection circuitry coupled to said computing module and to said peripheral console for conveying electrical power and signals between said computing module and said peripheral console;
   wherein said power supply connection point of said CPU is uncoupled from any electrical power source having sufficient energy to sustain execution of instructions by said CPU whenever said computing module is disconnected from said peripheral console,
   wherein said peripheral console further comprises a low-voltage differential signaling (LVDS) channel comprising two sets of unidirectional, multiple serial bit channels to transmit encoded Peripheral Component Interconnect bus transaction data in opposite directions.

50. The apparatus of claim 49 wherein said encoded Peripheral Component Interconnect bus transaction data comprises 10 bit packets.

51. A personal computer system wherein the core computing power and environment for a computer user can be readily separated and transported from the remaining computer system component comprising:
   (a) a detachable computing module including
      an enclosure,
      a CPU,
      memory coupled to said CPU,
      mass storage coupled to said CPU, and
      power supply circuitry having a stored energy capacity no greater than the energy required to power said CPU, memory, and mass storage for 30 minutes of operation at the maximum rated speed of the CPU;
   (b) a peripheral console comprising a power supply; and
   (c) interconnection circuitry coupled to said computing module and to said peripheral console for conveying electrical power and signals between said computing module and said peripheral console,
   wherein said peripheral console further comprises a low-voltage differential signaling (LVDS) channel comprising multiple pairs of unidirectional, serial bit channels to transmit data in opposite directions,
   wherein said LVDS channel is configured to communicate an encoded serial bit stream of Peripheral Component Interconnect bus transaction.

52. The apparatus of claim 51 wherein said interconnection circuitry is coupled to said LVDS channel to encode Peripheral Component Interconnect bus transaction data as said encoded serial bit stream.

53. The apparatus of claim 43 further comprising an integrated interface controller and north bridge unit to communicate said encoded Peripheral Component Interconnect bus transaction data, said integrated interface controller and north bridge unit is coupled to said CPU without any intervening Peripheral Component Interconnect bus, and said LVDS channel directly extends from said integrated interface controller and north bridge unit to convey said encoded Peripheral Component Interconnect bus transaction data.

54. The apparatus of claim 53 wherein said memory corresponds to a main memory that is coupled to said CPU through said integrated interface controller and north bridge unit.

55. The apparatus of claim 53 wherein said encoded Peripheral Component Interconnect bus transaction data comprises address and data bits of Peripheral Component Interconnect bus transaction in serial form.

56. The apparatus of claim 55 wherein said integrated interface controller and north bridge unit comprises a north bridge and an interface controller integrated with said north bridge, said interface controller is coupled to said CPU without any intervening Peripheral Component Interconnect bus, and said interface controller is configured to output said address and data bits of Peripheral Component Interconnect bus transaction in serial form that are conveyed over said LVDS channel.

57. The apparatus of claim 56 wherein said LVDS channel comprises a first plurality of unidirectional, differential signal pairs to convey data in a first direction and a second plurality of unidirectional, differential signal pairs to convey data in a second, opposite direction.

58. The apparatus of claim 46 further comprising a peripheral bridge to communicate said encoded address and data bits of Peripheral Component Interconnect bus transaction over said communication channel, and said peripheral bridge is directly coupled to said CPU.

59. The apparatus of claim 58 wherein said peripheral bridge is coupled to said CPU without any intervening Peripheral Component Interconnect bus, and said communication channel directly extends from said peripheral bridge to convey said encoded address and data bits of Peripheral Component Interconnect bus transaction.

60. The apparatus of claim 59 wherein said peripheral bridge comprises a north bridge.

61. The apparatus of claim 60 wherein said peripheral bridge comprises an interface controller integrated with said north bridge, said interface controller is coupled to said CPU without any intervening Peripheral Component Interconnect bus, and said interface controller is configured to output said encoded address and data bits of Peripheral Component Interconnect bus transaction in serial form that are conveyed over said communication channel.

62. The apparatus of claim 59 wherein said memory corresponds to a main memory that is coupled to said CPU through said peripheral bridge.

63. The apparatus of claim 49 wherein said encoded Peripheral Component Interconnect bus transaction data comprises information to permit decoding to create a Peripheral Component Interconnect bus transaction.

64. The apparatus of claim 49 wherein said LVDS channel corresponds to a first LVDS channel, and said detachable computing module comprises:
　a second LVDS channel comprising a first unidirectional, serial bit channel to transmit data in a first direction and a second unidirectional, serial bit channel to transmit data in a second, opposite direction; and
　a peripheral bridge coupled to said CPU without any intervening Peripheral Component Interconnect bus, said peripheral bridge comprising an integrated interface controller to communicate, over said second LVDS channel, encoded address and data bits of Peripheral Component Interconnect bus transaction in serial form.

65. The apparatus of claim 64, wherein said integrated interface controller is configured to communicate said encoded address and data bits of Peripheral Component Interconnect bus transaction as 10 bit packets.

66. The apparatus of claim 64 wherein said peripheral bridge comprises a north bridge.

67. The apparatus of claim 64 wherein said integrated interface controller is coupled to said CPU without any intervening Peripheral Component Interconnect bus.

68. The apparatus of claim 64 wherein said second LVDS channel directly extends from said integrated interface controller.

69. The apparatus of claim 64 wherein said memory corresponds to a main memory that is coupled to said CPU through said peripheral bridge.

70. The apparatus of claim 51 wherein said LVDS channel corresponds to a first LVDS channel, and said detachable computing module comprises:
　an integrated interface controller and bridge unit to output encoded address and data bits of Peripheral Component Interconnect bus transaction in serial form, said integrated interface controller and bridge unit directly coupled to said CPU; and
　a second LVDS channel coupled to said integrated interface controller and bridge unit to convey said encoded address and data bits of Peripheral Component Interconnect bus transaction in serial form.

71. The apparatus of claim 70 wherein said second LVDS channel comprises a first plurality of unidirectional, differential signal pairs to convey data in a first direction and a second plurality of unidirectional, differential signal pairs to convey data in a second, opposite direction.

72. The apparatus of claim 70 wherein said integrated interface controller and bridge unit comprises a north bridge and an interface controller integrated with said north bridge.

73. The apparatus of claim 70 wherein said integrated interface controller and bridge unit is coupled to said CPU without any intervening Peripheral Component Interconnect bus.

74. The apparatus of claim 73 wherein said second LVDS channel directly extends from said integrated interface controller and bridge unit.

75. The apparatus of claim 74 wherein said memory corresponds to a main memory that is coupled to said CPU through said integrated interface controller and bridge unit.

76. The apparatus of claim 70 wherein said first LVDS channel is configured to couple to said second LVDS channel.

77. The apparatus of claim 70 wherein said interconnection circuitry comprises a pair of mating connectors.

\* \* \* \* \*